United States Patent
Wei et al.

(10) Patent No.: US 12,022,461 B2
(45) Date of Patent: Jun. 25, 2024

(54) USER EQUIPMENT AND METHOD FOR SMALL DATA TRANSMISSION

(71) Applicant: FG Innovation Company Limited, Tuen Mun (HK)

(72) Inventors: Chia-Hung Wei, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/188,186

(22) Filed: Mar. 1, 2021

(65) Prior Publication Data

US 2021/0274525 A1    Sep. 2, 2021

Related U.S. Application Data

(60) Provisional application No. 62/982,713, filed on Feb. 27, 2020.

(51) Int. Cl.
     *H04W 72/1268*    (2023.01)
     *H04W 72/23*    (2023.01)
     (Continued)

(52) U.S. Cl.
     CPC ....... *H04W 72/1268* (2013.01); *H04W 72/23* (2023.01); *H04W 76/27* (2018.02); *H04W 76/34* (2018.02)

(58) Field of Classification Search
     CPC . H04W 72/1268; H04W 72/14; H04W 76/27; H04W 76/34; H04W 74/04;
     (Continued)

(56) References Cited

U.S. PATENT DOCUMENTS

2014/0038622 A1    2/2014    Zhu et al.
2019/0357119 A1*   11/2019    Hong .................... H04W 48/02
(Continued)

FOREIGN PATENT DOCUMENTS

CN         110087338       8/2019
WO     2021136474 A1     7/2021

OTHER PUBLICATIONS

3GPP TS 38.331 V15.8.0 (Dec. 2019), Release 15, uploaded date Jan. 8, 2020, (Year: 2020).*

(Continued)

*Primary Examiner* — Mohammed S Chowdhury
(74) *Attorney, Agent, or Firm* — ScienBiziP, P.C.

(57) ABSTRACT

A user equipment (UE) and a method for small data transmission are provided. The method includes receiving a Radio Resource Control (RRC) release message from a base station (BS), the RRC release message including a small data transmission configuration indicating a radio bearer to be retained; suspending all established signaling radio bearers (SRBs) and data radio bearers (DRBs) except SRB0 and the indicated radio bearer; transitioning from an RRC_CONNECTED state to an RRC_INACTIVE or RRC_IDLE state; performing the small data transmission via a random access (RA) procedure by applying the small data transmission configuration; receiving, from the BS, a downlink (DL) response message including a specific uplink (UL) resource indication indicating a Physical Uplink Shared Channel (PUSCH) associated with a configured grant; and determining whether to perform subsequent data transmission after receiving a random access response (RAR) for the RA procedure according to the specific UL resource indication.

10 Claims, 19 Drawing Sheets

(51) Int. Cl.
*H04W 76/27* (2018.01)
*H04W 76/34* (2018.01)

(58) Field of Classification Search
CPC ..... H04W 48/08; H04W 48/02; H04W 76/25; H04W 48/12; H04L 1/1614
See application file for complete search history.

(56) References Cited

U.S. PATENT DOCUMENTS

| | | | |
|---|---|---|---|
| 2020/0092939 A1* | 3/2020 | Kim | H04W 76/30 |
| 2020/0267762 A1* | 8/2020 | Lee | H04W 76/27 |
| 2021/0211994 A1* | 7/2021 | Shih | H04W 80/02 |
| 2021/0243777 A1* | 8/2021 | Tsai | H04W 72/1268 |
| 2021/0259040 A1* | 8/2021 | Babaei | H04W 56/00 |
| 2021/0337602 A1* | 10/2021 | Liu | H04W 74/008 |
| 2022/0201791 A1* | 6/2022 | Yao | H04W 76/19 |

OTHER PUBLICATIONS

3GPP TSG-RAN WG2 #103; R2-1811868; Source: LG Electronics Inc., Title: PDCP re-establishment at RRC Resume; Gothenburg, Sweden, Aug. 20-Aug. 24, 2018. (Year: 2018).*
Qualcomm Incorporated, Small data transmission in inactive state, 3GPP TSG-RAN WG3 NR Ad Hoc Meeting, Spokane, Washington, USA, Jan. 17-19, 2017, R3-170158.
Samsung, Procedures related consideration to NOMA, 3GPP TSG RAN WG1 Meeting #95, Spokane, USA, Nov. 12-16, 2018, R1-1812968, sections 2-4.
3GPP TS 38.331, "3rd Generation Partnership Project; Technical Specification Group Radio Access Network; NR; Radio Resource Control (RRC) protocol specification (Release 15)", V15.6.0 (Jun. 2019).
3GPP TS 38.321, "3rd Generation Partnership Project; Technical Specification Group Radio Access Network; NR; Medium Access Control (MAC) protocol specification (Release 15)", V15.12.0 (Mar. 2021).
3GPP TS 38.214, "3rd Generation Partnership Project; Technical Specification Group Radio Access Network; NR; Physical layer procedures for data (Release 15)", V15.12.0 (Mar. 2021).
Qualcomm Incorporated: "Remaining issues on control plane aspects of NR small data transmission", 3GPP Draft; R2-2101223, 3GPP TSG-RAN WG2 Meeting #113e, Online, Jan. 25-Feb. 5, 2020 (Jan. 15, 2021).

* cited by examiner

USER EQUIPMENT AND METHOD FOR SMALL DATA TRANSMISSION

CROSS-REFERENCE TO RELATED APPLICATION(S)

The present disclosure claims the benefit of and priority of provisional U.S. Patent Application Ser. No. 62/982,713, filed on Feb. 27, 2020, entitled "Data Transmission in RRC_INACTIVE State via Random Access" ("the '713 provisional"). The disclosure of the '713 provisional is hereby incorporated fully by reference into the present disclosure for all purposes.

FIELD

The present disclosure is related to wireless communication, and specifically, to small data transmission in cellular wireless communication networks.

BACKGROUND

Abbreviations used in this disclosure include:

| Abbreviation | Full name |
| --- | --- |
| 3GPP | $3^{rd}$ Generation Partnership Project |
| 5 G | $5^{th}$ Generation |
| ACK | Acknowledgment |
| AS | Access Stratum |
| BFD | Beam Failure Detection |
| BFR | Beam Failure Recovery |
| BS | Base Station |
| BSR | Buffer Status Report |
| BWP | Bandwidth Part |
| C-RNTI | Cell Radio Network Temporary Identifier |
| CA | Carrier Aggregation |
| CCCH | Common Control Channel |
| CG | Configured Grant |
| CORESET | Control Resource Set |
| CRC | Cyclic Redundancy Check |
| CS-RNTI | Configured Scheduling Radio Network Temporary Identifier |
| CSI | Channel State Information |
| CSI-RS | Channel State Information Reference Signal |
| CSS | Common Search Space |
| DC | Dual Connectivity |
| DCI | Downlink Control Information |
| DL | Downlink |
| DL-SCH | Downlink Shared Channel |
| DRB | (user) Data Radio Bearer |
| DRX | Discontinuous Reception |
| E-UTRA | Evolved Universal Terrestrial Radio Access |
| EN-DC | E-UTRA NR Dual Connectivity |
| ETSI | European Telecommunications Standards Institute |
| FR | Frequency Range |
| HARQ | Hybrid Automatic Repeat Request |
| HARQ-ACK | HARQ Acknowledgement |
| ID | Identifier |
| IE | Information Element |
| ITU | International Telecommunication Union |
| LBT | Listen Before Talk |
| LCH | Logical Channel |
| LCID | Logical Channel ID |
| LCP | Logical Channel Prioritization |
| LTE | Long Term Evolution |
| MAC | Medium Access Control |
| MAC CE | MAC Control Element |
| MCG | Master Cell Group |
| MCS | Modulation Coding Scheme |
| MCS-C-RNTI | Modulation Coding Scheme Cell Radio Network Temporary Identifier |
| MIMO | Multi-Input Multi-Output |
| MN | Master Node |
| MSGA | Message A |
| MSGB | Message B |
| MSGB-RNTI | Message B Radio Network Temporary Identifier |
| NACK | Negative Acknowledgment |
| NAS | Non-Access Stratum |
| NDI | New Data Indicator |
| NR | New Radio |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom |
| PHY | Physical (layer) |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAR | Random Access Response |
| RF | Radio Frequency |
| RLC | Radio Link Control |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SCS | Subcarrier Spacing |
| SDAP | Service Data Adaptation Protocol |
| SDU | Service Data Unit |
| SN | Secondary Node |
| SRB | Signaling Radio Bearer |
| SS-RSRP | Synchronization Signal Reference Signal Received Power |
| SSB | Synchronization Signal Block |
| SUL | Supplementary Uplink |
| TB | Transport Block |
| TS | Technical Specification |
| UE | User Equipment |
| UL | Uplink |
| UL-SCH | Uplink Shared Channel |

Various efforts have been made to improve different aspects of wireless communication for cellular wireless communication systems, such as 5G NR by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to small data transmission in cellular wireless communication networks.

According to an aspect of the present disclosure, a method for small data transmission performed by a UE is provided. The method includes: receiving an RRC release message from a BS while in an RRC_CONNECTED state, the RRC release message including a small data transmission configuration, the small data transmission configuration indicating at least one radio bearer to be retained for supporting the small data transmission; suspending all established SRBs and DRBs except SRB0 and the indicated at least one radio bearer; transitioning from the RRC_CONNECTED state to one of an RRC_INACTIVE state and an RRC_IDLE state according to the RRC release message; performing the small data transmission via an RA procedure while the UE is in one of the RRC_INACTIVE state and the RRC_IDLE state by applying the small data transmission configuration; receiving, from the BS, a DL response message including a specific uplink (UL) resource indication in response to the small data transmission, the specific UL resource indication indicating a Physical Uplink Shared Channel (PUSCH) associated with a configured grant; and determining whether to perform subsequent data transmission after receiving an RAR for the RA procedure according to the specific UL resource indication, the subsequent data transmission performed while remaining in the one of the RRC_INACTIVE state and the RRC_IDLE state.

According to another aspect of the present disclosure, a UE for small data transmission is provided. The UE includes a processor and a memory coupled to the processor. The memory stores a computer-executable program that when executed by the processor, causes the processor to receive an RRC release message from a BS while in an RRC_CONNECTED state, the RRC release message including a small data transmission configuration, the small data transmission configuration indicating at least one radio bearer to be retained for supporting the small data transmission; suspend all established SRBs and DRBs except SRB0 and the indicated at least one radio bearer; transition from the RRC_CONNECTED state to one of an RRC_INACTIVE state and an RRC_IDLE state according to the RRC release message; perform the small data transmission via an RA procedure while the UE is in one of the RRC_INACTIVE state and the RRC_IDLE state by applying the small data transmission configuration; receive, from the BS, a DL response message including a specific UL resource indication in response to the small data transmission, the specific UL resource indication indicating a Physical Uplink Shared Channel (PUSCH) associated with a configured grant; and determine whether to perform subsequent data transmission after receiving an RAR for the RA procedure according to the specific UL resource indication, the subsequent data transmission performed while remaining in the one of the RRC_INACTIVE state and the RRC_IDLE state.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1A:
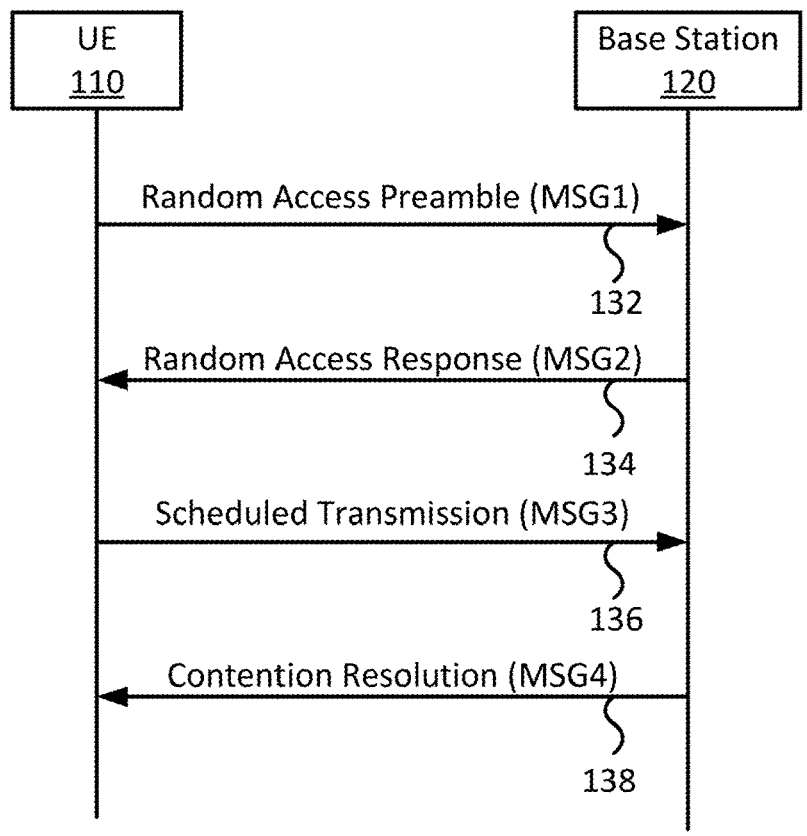
FIG. 1A illustrates a 4-step CBRA procedure according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Cell: A radio network object that may be uniquely identified by a UE from a (cell) identification that is broadcast over a geographical area from one UTRAN Access Point. A Cell may be operated in a Frequency Division Duplex (FDD) or a Time Division Duplex (TDD) mode.

Serving Cell: For a UE in an RRC_CONNECTED state and not configured with CA/DC, there may be only one serving cell comprising of the primary cell (PCell). For a UE in the RRC_CONNECTED state and configured with CA/DC, the term "serving cells" may be used to indicate the set of cells comprising of the Special Cell(s) and all secondary cells.

Carrier Aggregation (CA): In CA, two or more Component Carriers (CCs) may be aggregated. A UE may simultaneously receive or transmit on one or multiple CCs depending on its capabilities. CA may be supported for both contiguous and non-contiguous CCs. When CA is applied, the frame timing and the system frame number (SFN) may be aligned across cells that are aggregated. The maximum number of configured CCs for a UE may be 16 for DL and 16 for UL. When CA is configured, the UE may only have one RRC connection with the network. During the RRC connection establishment/re-establishment/handover, one serving cell may provide the NAS mobility information, and during the RRC connection re-establishment/handover, one serving cell may provide the security input, where the serving cell may be referred to as the PCell. Depending on UE capabilities, SCells may be configured to form with the PCell as a set of serving cells. The configured set of serving cells for a UE therefore includes one PCell and one or more SCells.

Configured Grant (CG): A BS (e.g., a gNB) may allocate UL resources for the initial HARQ transmissions to UEs. In NR, the gNB may dynamically allocate UL resources to UEs via UE specific RNTI (e.g., C-RNTI) on a PDCCH. A UE periodically monitors the PDCCH(s) in order to find possible grants for UL transmission. In addition to the dynamic grant (DG) mentioned previously, the gNB may preconfigure periodic UL resource on a PUSCH to the UE, which may be referred to as configured grants (CG). There are two types of CGs:

Type 1: the RRC entity may directly provide the configured UL grant (including the periodicity). The gNB may provide the configured grant (including the periodicity) via DL RRC signaling and the configured grant is valid for transmission once the configuration is received and corresponding reconfiguration is finished.

Type 2: the RRC entity may define the periodicity of the configured UL grant while PDCCH addressed to the CS-RNTI may either signal and activate or deactivate the configured UL grant. The PDCCH addressed to the CS-RNTI may indicate that the configured UL grant may be implicitly reused according to the periodicity defined by the RRC entity until the configured UL grant is deactivated. The gNB may provide the configured grant (including the periodicity) via DL RRC signaling. The configured grant may be considered valid (can be applied by the UE for transmission) once an activation signaling is received from the gNB and until a deactivation signaling is received from the gNB, where both the activation and deactivation signaling may be physical signaling. More specifically, the signaling is transmitted on the PDCCH addressed to the CS-RNTI.

When a configured UL grant is active, a UL transmission according to the configured UL grant may be performed if the UE cannot find its C-RNTI/CS-RNTI/MCS-C-RNTI on the PDCCH(s). Otherwise, if the UE finds its C-RNTI/CS-RNTI/MCS-C-RNTI on the PDCCH(s), the PDCCH allocation may override the configured UL grant. The usage of the MCS-C-RNTI may be equivalent to that of the C-RNTI in MAC procedures (except for the C-RNTI MAC CE).

HARQ: A functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

HARQ-ACK: HARQ-ACK may include a 1-bit indicator, where the HARQ-ACK may be a negative Acknowledgement (NACK) when the bit value of the indicator is set to a first value (e.g., "0") and may be a positive Acknowledgement (ACK) when the bit value of the indicator is set to a second value (e.g., "1").

Timer: a MAC entity may setup one or more timers for individual purposes, such as triggering UL signaling retransmission or limiting UL signaling retransmission periods. When a timer (e.g., the timers in various implementations of the present disclosure) maintained by the MAC entity is started, the timer may start running until it stops or expires. The timer may not run if it is not started. The timer may be started if it is not running. The timer may be restarted if it is running. The timer may be started or restarted from its initial value, which may be configured by a BS (e.g., a gNB) via DL RRC signaling, but not limited thereto.

BWP: A subset of the total cell bandwidth of a cell. Bandwidth Adaptation (BA) may be achieved by configuring the UE with BWP(s) and telling the UE which of the configured BWPs is currently the active one. To enable BA on the PCell, a BS (e.g., a gNB) may configure the UE with UL BWP(s) and DL BWP(s). To enable BA on SCells in case of CA, the BS may configure the UE with DL BWP(s) at least (which means there may be no UL BWP configured to the UE). For the PCell, the initial BWP may be the BWP used for initial access. For the SCell(s), the initial BWP may be the BWP configured to the UE to first operate during the SCell activation process. The UE may be configured with a first active uplink BWP via a firstActiveUplinkBWP IE field. If the first active uplink BWP is configured for an SpCell, the firstActiveUplinkBWP IE field may contain the ID of the UL BWP to be activated upon performing the RRC (re-)configuration. If the field is absent, the RRC (re-)configuration may not trigger a BWP switch. If the first active uplink BWP is configured for an SCell, the firstActiveUplinkBWP IE field may contain the ID of the UL BWP to be used upon MAC-activation of the SCell.

PDCCH: ABS (e.g., a gNB) may dynamically allocate DL resources to UEs via the C-RNTI/MCS-C-RNTI/CS-RNTI on PDCCH(s). The UE may monitor the PDCCH(s) to find possible assignments when its DL reception is enabled (e.g., activity governed by DRX when configured). When CA is configured, the same C-RNTI may apply to all serving cells.

PDSCH/PUSCH: A PDCCH may be used to schedule DL transmissions on a PDSCH and UL transmissions on a PUSCH.

Time Alignment Timer: An RRC entity may configure the initial value of a timer (e.g., a time alignment timer, corresponding to the IE "timeAlignmentTimer"). The timer may be used for the maintenance of UL time alignment. The time alignment timer may be maintained per timing advance group. The timer may control how long the MAC entity considers the serving cells belonging to the associated TAG to be UL time aligned.

SLIV: Start and Length Indicator Value for the time domain allocation for PUSCH/PDSCH. SLIV may define the start symbol and the number of consecutive symbols for PUSCH/PDSCH allocation.

TB: Data given from an upper layer (or MAC layer) to a PHY layer may be referred to as a TB.

Primary Cell (PCell): The MCG cell, operating on the primary frequency, in which the UE either performs the initial connection establishment procedure or initiates the connection re-establishment procedure.

Primary SCG Cell (PSCell): For dual connectivity operation, the SCG cell in which the UE performs random access when performing the Reconfiguration with Sync procedure.

Serving Cell: For a UE in the RRC_CONNECTED state not configured with CA/DC there is only one serving cell comprising of the primary cell. For a UE in the RRC_CONNECTED state configured with CA/DC the term "serving cells" is used to denote the set of cells comprising of the Special Cell(s) and all secondary cells.

Secondary Cell (SCell): For a UE configured with CA, a cell providing additional radio resources on top of Special Cell.

Special Cell (SpCell): For Dual Connectivity operation the term Special Cell refers to the PCell of the MCG or the PSCell of the SCG, otherwise the term Special Cell refers to the PCell.

Master Cell Group (MCG): in MR-DC, a group of serving cells associated with the Master Node, comprising of the SpCell (e.g., PCell) and optionally one or more SCells.

Master node: in MR-DC, the radio access node that provides the control plane connection to the core network. It may be a Master eNB (in E-UTRANR-Dual Connectivity (EN-DC)), a Master ng-eNB (in Next Generation E-UTRA NR-Dual Connectivity (NGEN-DC)) or a Master gNB (in NR NR-Dual Connectivity (NR-DC) and NR E-UTRA-Dual Connectivity (NE-DC)).

Secondary Cell Group (SCG): in MR-DC, a group of serving cells associated with the Secondary Node, comprising of the SpCell (e.g., PSCell) and optionally one or more SCells.

Secondary node: in MR-DC, the radio access node, with no control plane connection to the core network, providing additional resources to the UE. It may be a gNB (in EN-DC), a Secondary ng-eNB (in NE-DC) or a Secondary gNB (in NR-DC and NGEN-DC).

The terms, definitions and abbreviations in the present disclosure may be imported from existing documentation (ETSI, ITU or elsewhere) or newly created by 3GPP experts whenever a need for precise vocabulary is identified.

Types of a Random Access (RA) Procedure

In addition to a 4-step RA procedure, a 2-step RA procedure is expected to be supported in next generation cellular wireless communication system (e.g., 3GPP NR wireless communication system) in near future. Therefore, there will be at least three types of RA procedure supported: a 4-step contention based random access (CBRA), a 2-step CBRA, and contention free random access (CFRA).

FIG. 1A illustrates a 4-step CBRA procedure 100A according to an example implementation of the present disclosure. In action 132, a UE 110 transmits a random access preamble, also referred to as a Message 1 (MSG1), over a Physical Random Access Channel (PRACH) to a base station (BS) 120. In action 134, the BS 120 transmits a Random Access Response (RAR), also referred to as a Message 2 (MSG2), indicating reception of the preamble and providing a time-alignment command to the UE 110. In action 136, the UE 110 transmits a Message 3 (MSG3) to the BS 120. A MSG3 may be the first scheduled transmission of the 4-step CBRA procedure 100A. A MSG3 may include a cell-radio network temporary identifier (C-RNTI) MAC CE or common control channel (CCCH) service data unit (SDU), submitted from an upper layer and associated with the UE Contention Resolution Identity. In action 138, the BS 120 transmits a Message 4 (MSG4) for contention resolution to the UE 110. The UE 110 and the BS 120 may exchange messages (e.g., MSG3 and MSG4) with the aim of resolving potential collisions due to simultaneous transmissions of the same preamble from multiple devices within the cell over the same time/frequency resources.

Figure 1B:
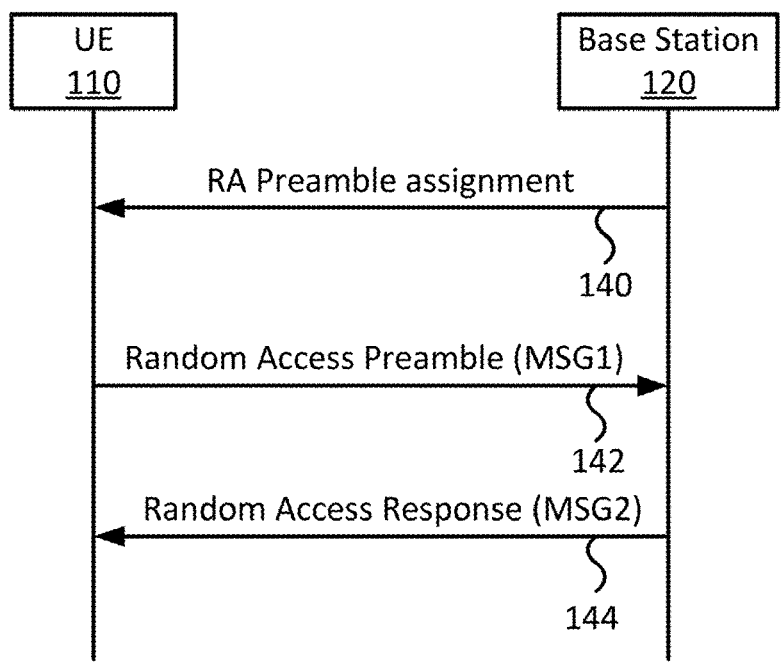
FIG. 1B illustrates a CFRA procedure according to an example implementation of the present disclosure.

FIG. 1B illustrates a CFRA procedure 100B according to an example implementation of the present disclosure. In action 140, the BS 120 assigns a RA preamble to the UE 110. In action 142, the UE 110 transmits a random access preamble, also referred to as a MSG1, to the BS 120. In action 144, the BS 120 transmits a random access response, also referred to as a MSG2, to the UE 110.

Figure 1C:
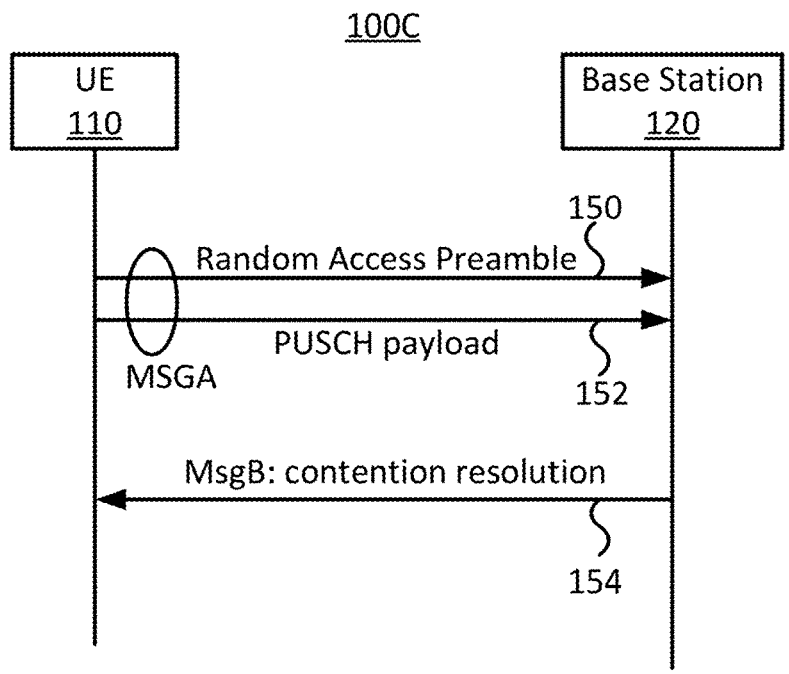
FIG. 1C illustrates a 2-step CBRA procedure according to an example implementation of the present disclosure.

FIG. 1C illustrates a 2-step CBRA procedure 100C according to an example implementation of the present disclosure. The 2-step CBRA procedure 100C may include transmission of a Message A (MSGA) to the BS 120 and reception of a Message B (MSGB) from the BS 120. The transmission of the MSGA may include transmission of a random access preamble transmission on a PRACH (action 150) and a payload transmission on a PUSCH (action 152). In one implementation, the payload of the MSGA may carry at least contents equivalent to a MSG3 in the 4-step CBRA procedure illustrated in FIG. 1A. After successful detection of the PRACH preamble and decoding of the PUSCH payload in the MSGA, in action 154, the BS 120 transmits the MSGB to the UE 110 for contention resolution. The UE 110 monitors MSGB reception from the BS 120 within a configured window. If contention resolution is successful upon receiving the MSGB, the UE ends the 2-step CBRA procedure 100C.

Figure 1D:
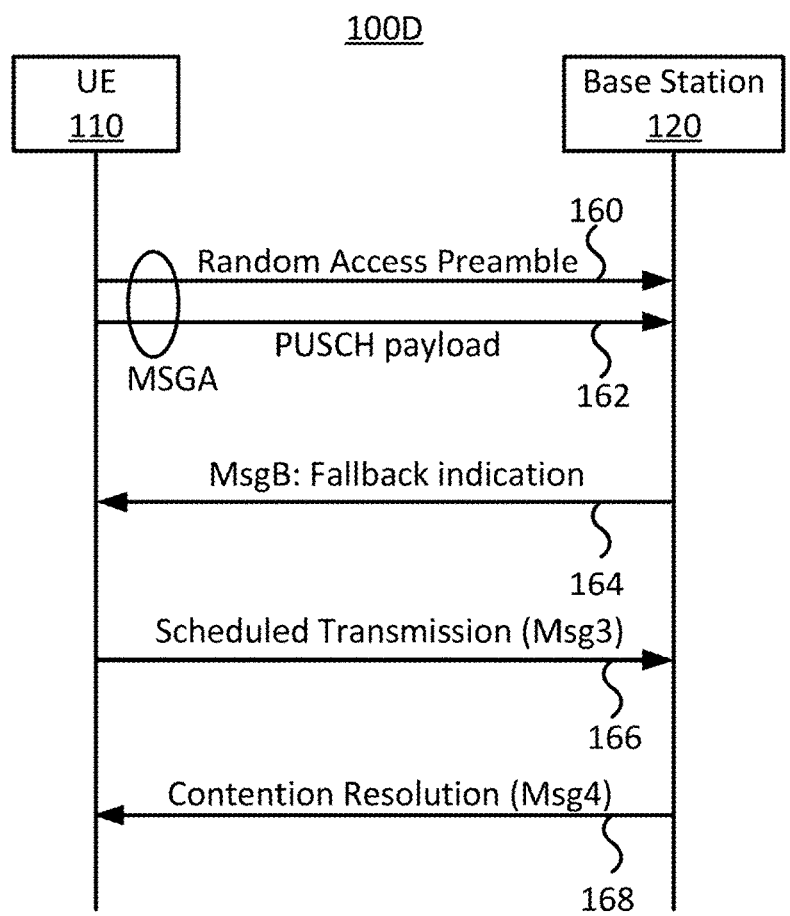
FIG. 1D illustrates a fallback procedure from a 2-step CBRA to a 4-step CBRA according to an example implementation of the present disclosure.

FIG. 1D illustrates a fallback procedure 100D from a 2-step CBRA to a 4-step CBRA according to an example implementation of the present disclosure. The UE 110 may first attempt the 2-step CBRA by transmitting a MSGA to the BS 120, including transmission of a random access preamble in action 160 and transmission of a PUSCH payload in action 162. In action 164, the UE 110 receives a fallback indication in a MSGB from the BS 120. The fallback indication instructs the UE 110 to fallback from the 2-step CBRA to the 4-step CBRA. In action 166, the UE 110 transmits a MSG3 (substantially similar to the MSG3 illustrated in FIG. 1A) to the BS 120. In action 168, the UE 110 monitors a MSG4 from the BS 120 for contention resolution (substantially similar to the MSG4 illustrated in FIG. 1A). If contention resolution is not successful after transmission/retransmission(s) of the MSG3, the UE 110 may go back to MSGA transmission (action 160 and action 162). If the 2-step CBRA procedure is not successfully completed after a configured number of MSGA transmissions, the UE 110 may switch to the 4-step CBRA procedure.

For random access in a serving cell configured with SUL, the BS (also referred to as the network, NW) may explicitly signal which carrier to use (UL or SUL). If the NW does not indicate which carrier to use, the UE may select the SUL carrier if and only if the measured DL quality is lower than a broadcast threshold. In one implementation, the UE performs carrier selection before selecting between a 2-step and a 4-step random access. Once the random access procedure is started, all UL transmissions of the random access procedure remain on the selected carrier.

Although some of the fundamental messages that need to be exchanged between the UE and the BS on radio access network for the 2-step RA procedure have been defined, it is not clear with regard to what detailed information and parameter(s) need to be carried in these messages. It is also not clear with regard to how the BS and the UE react to the received information and parameter(s). In addition, from the wireless communication system's perspective, the format of these parameters and the triggering condition of the reaction behavior performed by the UE and the gNB need to be defined. Furthermore, the situation may become even more unclear when the radio access network is deployed in unlicensed spectrum bands. Implementations regarding the 2-step RA procedure, including overall behavior, MSGB reception, and behaviors in unlicensed spectrum bands, are provided in the present disclosure.

Modelling of Overall Behavior of RA Procedure

Figure 2A:
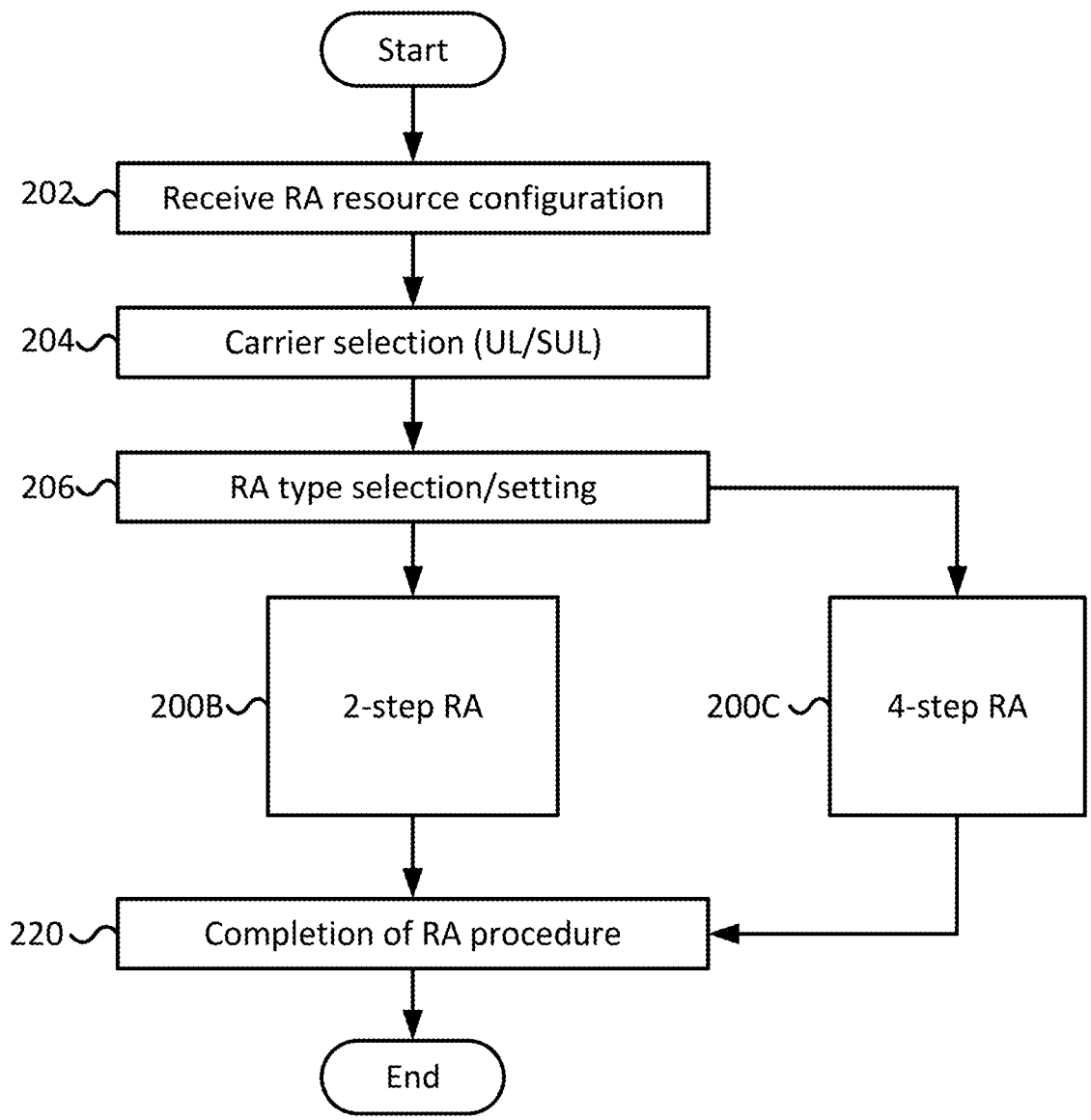
FIG. 2A illustrates a flowchart of an overall RA procedure according to an example implementation of the present disclosure.

FIG. 2A illustrates a flowchart of an overall RA procedure 200A according to an example implementation of the present disclosure. A UE may be configured with both 2-step and 4-step RA resources by a BS (e.g., gNB).

In action 202, the UE receives an RA related configuration(s) from the gNB via information elements (IEs) such as RACH-ConfigCommon, RACH-ConfigDedicated, RACH-ConfigGeneric, RA Prioritization and/or any other IEs that may be contained in broadcast RRC messages and/or unicast RRC messages. The RA related configuration may include, but is not limited to:

rsrp-ThresholdSSB-SUL: an RSRP threshold for the selection between the normal uplink (NUL) carrier and the SUL carrier.

msgA-RSRP-Threshold: an RSRP threshold for selection of 2-step random access.

msgATransMax: a maximum number of times a UE can transmit MSGA. The UE may fallback to 4-step RA after msgATransMax times of MSGA transmission.

msgB-ResponseWindow: the time window to monitor MSGB (e.g., RA response(s)).

beamFailureRecoveryTimer_2StepRA: a timer for beam failure recovery. In one implementation, the UE does not use CFRA for BFR upon expiration of the timer. The value of the timer may be in units of milliseconds (ms). The UE may start the timer when the UE triggers an RA procedure for BFR and the UE selects the 2-step RA.

In action 204, the UE performs UL carrier selection. The UE measures the pathloss of DL reference signal preconfigured to be associated with UL and SUL. The UE selects the SUL carrier for performing the RA procedure if the RSRP of the DL pathloss reference is less than the rsrp-ThresholdSSB-SUL; otherwise, the UE selects the normal UL carrier.

In action 206, the UE performs RA type selection. The UE may select a 2-step RA and proceed to action 200B if the msgA-RSRP-Threshold is configured and the RSRP of DL pathloss reference is above the configured msgA-RSRP-Threshold. The UE may also select the 2-step RA and proceed to action 200B if the BWP selected for the RA procedure is only configured with 2-step RA resources. The UE may select a 4-step RA and proceed to action 200C if the UE does not select the 2-step RA.

Figure 2B:
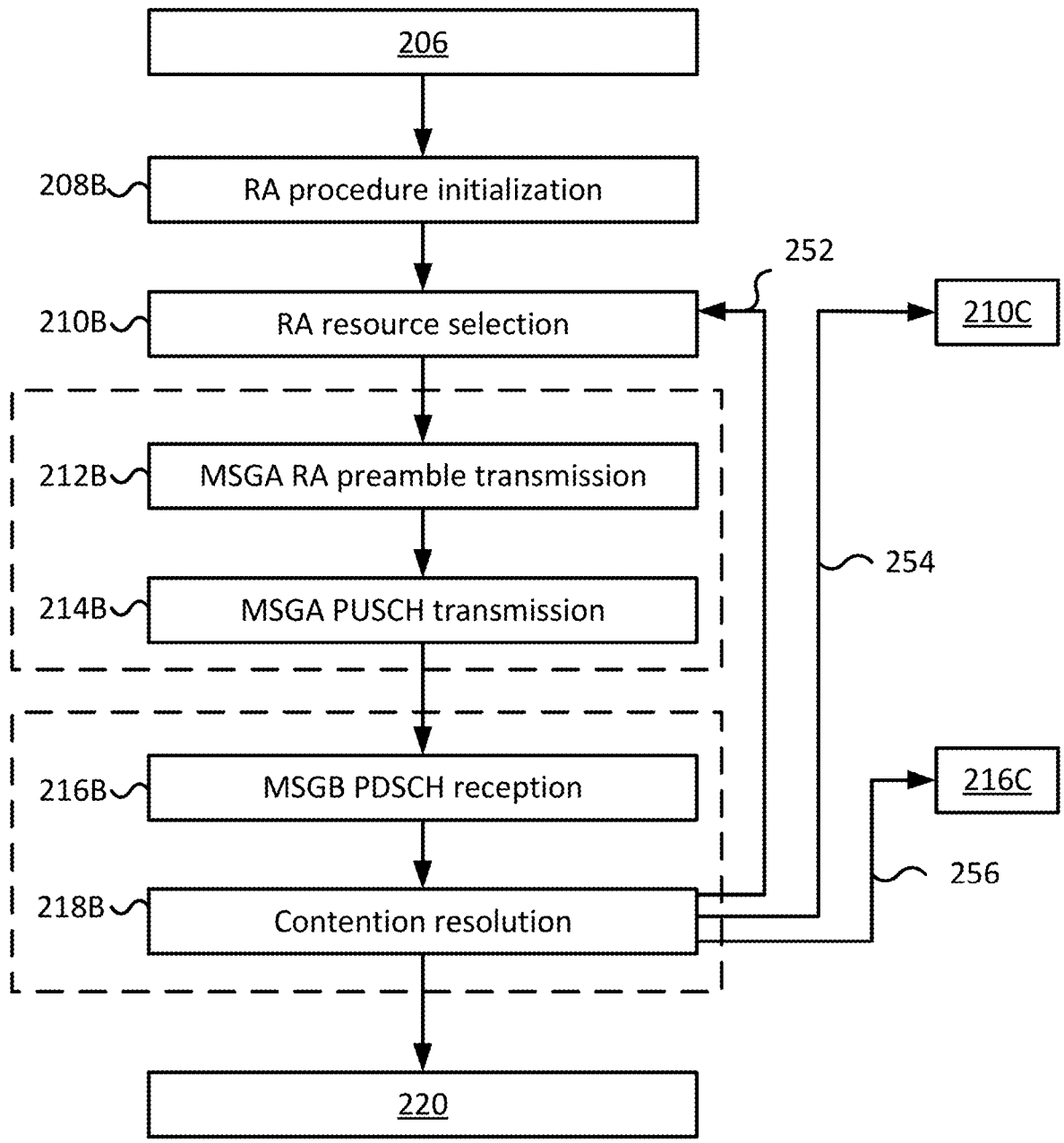
FIG. 2B illustrates a flowchart of a 2-step CBRA procedure according to an example implementation of the present disclosure.
Figure 2C:
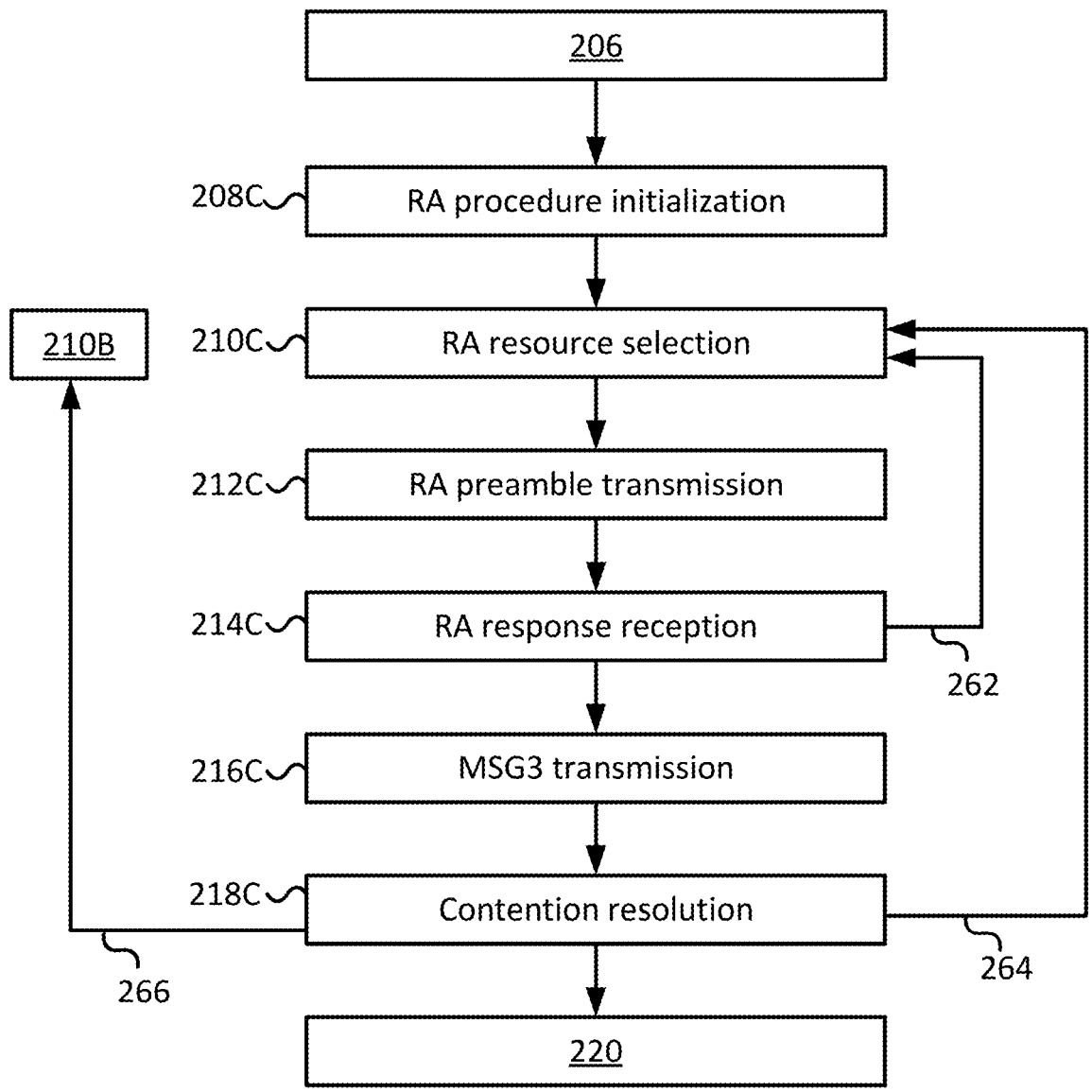
FIG. 2C illustrates a flowchart of a 4-step CBRA procedure according to an example implementation of the present disclosure.

FIG. 2B illustrates a flowchart of a 2-step CBRA procedure 200B according to an example implementation of the present disclosure. FIG. 2C illustrates a flowchart of a 4-step CBRA procedure 200C according to an example implementation of the present disclosure.

In action 208B, the UE performs RA procedure initialization. The RRC layer of the UE may configure the MAC layer of the UE with RA related parameters for the RA procedure according to the RA related configuration(s) received in action 202.

In action 210B, the UE performs RA resource selection. The UE may select RA resources associated with a SSB if the SSB with SS-RSRP above a rsrp-ThresholdSSB (as defined in 3GPP TS 38.331) among the associated SSBs is available. The RA resource selection may include a selection between CBRA resource and CFRA resource. In this example, the UE selects a CBRA resource and thus performs the 2-step CBRA. The 2-step CBRA may include MSGA transmission (action 212B and action 214B) and MSGB reception (action 216B and action 218B).

In action 212B, the UE performs MSGA RA preamble transmission. The UE may select an RA preamble randomly with equal probability from the 2-step RA preambles associated with the selected SSB. The UE may perform corresponding preamble transmission by using the selected PRACH occasion as the first part of MSGA transmission. The UE may compute a MSGB-RNTI associated with the PRACH occasion in which the RA preamble is transmitted.

In action 214B, the UE performs MSGA PUSCH transmission based on the MSGB-RNTI. Implementations of the MSGA PUSCH (e.g., payload of the MSGA) are illustrated in FIG. 3A and FIG. 3B.

Figure 3A:
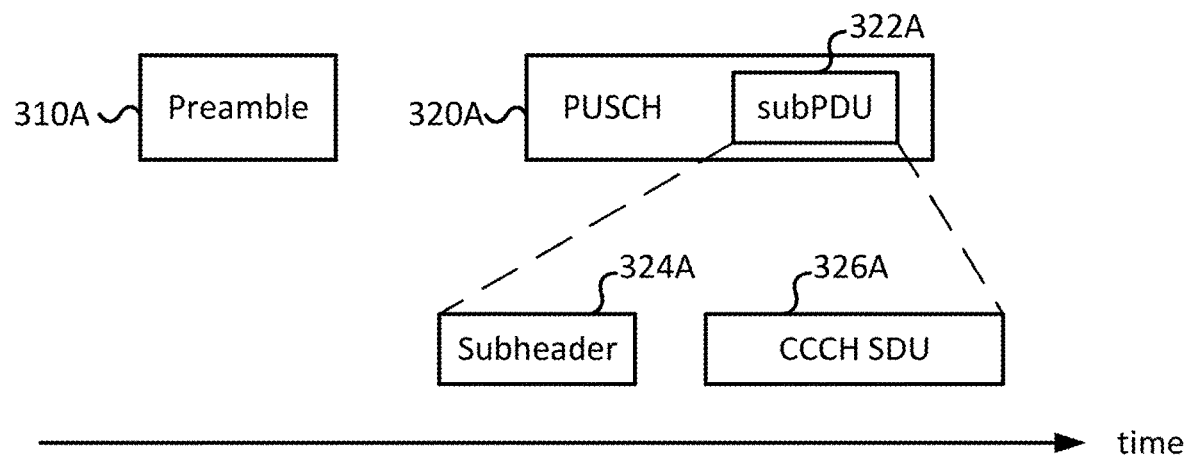
FIG. 3A illustrates a MSGA including a payload including a CCCH SDU according to an example implementation of the present disclosure.

FIG. 3A illustrates a MSGA 300A including a payload including a CCCH SDU according to an example implementation of the present disclosure. The MAC entity of the UE may indicate to the Multiplexing and assembly (M&A) entity to include a CCCH SDU 326A (e.g., a MAC SDU from CCCH) in the subsequent UL transmission if the PUSCH 320A transmission is being made for the CCCH logical channel. The PUSCH 320A may be associated with a preamble 310A and the PRACH occasion. The MSGA 300A includes the preamble 310A and PUSCH 320A (payload of the MSGA 300A) including a subPDU 322A. The subPDU 322A includes a subheader 324A and a CCCH SDU 326A.

Figure 3B:
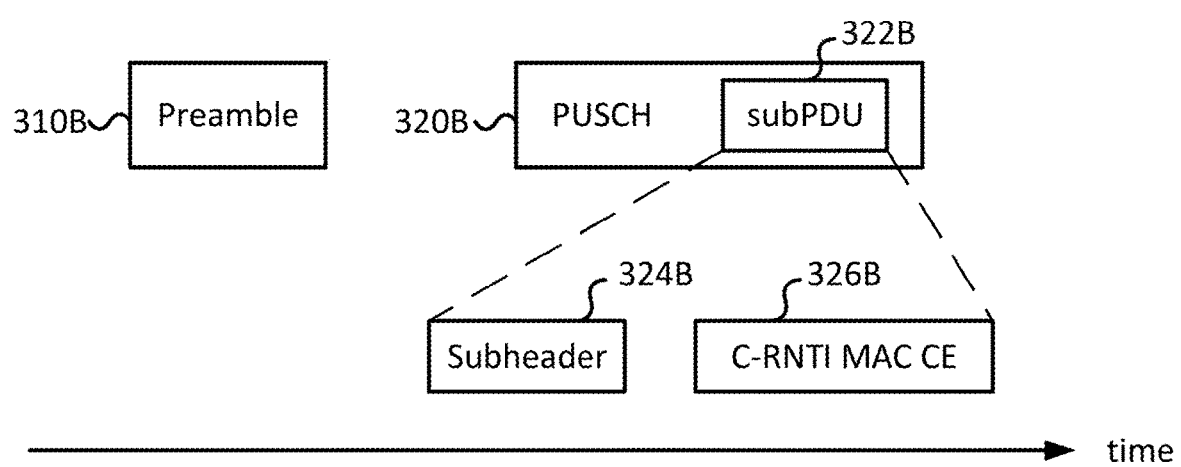
FIG. 3B illustrates a MSGA including a payload including a C-RNTI MAC CE according to an example implementation of the present disclosure.

FIG. 3B illustrates a MSGA 300B including a payload including a C-RNTI MAC CE according to an example implementation of the present disclosure. The MAC entity of the UE may indicate to the M&A entity to include a C-RNTI MAC CE 326B in the subsequent UL transmission (e.g., a PUSCH 320B associated with a preamble 310B) if the PUSCH 320B transmission is not being made for the CCCH logical channel (for example, the RA is triggered for beam failure recovery or the RA is triggered for RRC connection resume procedure). The PUSCH 320B may be associated with the preamble 310B and the PRACH occasion. The MSGA 300B includes preamble 310B and PUSCH 320B (payload of the MSGA 300B) including a subPDU 322B. The subPDU 322B includes a subheader 324B and a C-RNTI MAC CE 326B. In one implementation the UE is in an RRC_CONNECTED state. Because the C-RNTI is UE specific, by including C-RNTI MAC CE in the MSGA 300B, the BS can identify the UE performing the RA procedure based on the received MSGA 300B. The BS can then schedule data transmission with the identified UE using the C-RNTI.

Afterward, the MAC entity of the UE may instruct the PHY layer to transmit the PUSCH 320A/320B using the corresponding MSGB-RNTI as the second part of the MSGA transmission (action 212B being the first part of the MSGA transmission). Specifically, a TB for the PUSCH 320A/320B transmission may be with CRC bits scrambled by the MSGB-RNTI. The preamble 310A/310B is identified by an RA-RNTI, whereas the PUSCH 320A/320B is identified by the MSGB-RNTI.

Referring back to FIG. 2B, in action 216B, the UE performs MSGB PDSCH reception. Once the MSGA is transmitted, the UE may start a MSGB window (e.g., msgB-Response Window). In one implementation, the MSGB window may be started from the beginning of the first symbol of the upcoming PDCCH after the MSGA transmission. In another implementation, the MSGB window may be started from the beginning of the first symbol of the upcoming PDCCH after the MSGA transmission plus a timing offset. The timing offset may be predefined in the technical specification and/or preconfigured by the gNB on a per BWP/serving cell basis, but is not limited thereto.

Figure 4A:
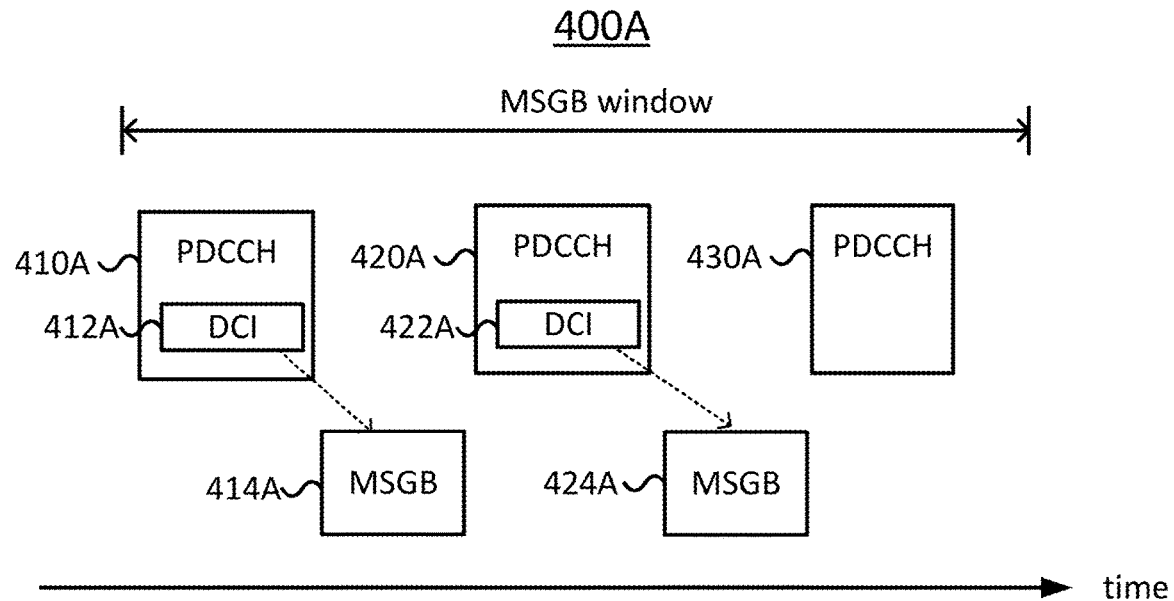
FIG. 4A illustrates a process of MSGB reception when payload of MSGA includes a CCCH SDU according to an example implementation of the present disclosure.

FIG. 4A illustrates a process 400A of MSGB reception when payload of MSGA includes a CCCH SDU according to an example implementation of the present disclosure. The UE may monitor PDCCHs (including PDCCH 410A, PDCCH 420A, PDCCH 430A) for an RAR identified by the MSGB-RNTI within the MSGB window. For example, DCI 412A with CRC bits scrambled by a first MSGB-RNTI schedules a MSGB 414A on a first PDSCH. DCI 422A with CRC bits scrambled by a second MSGB-RNTI schedules a MSGB 424A on a second PDSCH. If the first MSGB-RNTI is associated with the PRACH occasion in which the RA preamble is transmitted by the UE, the UE may successfully decode the DCI 412A and then receive the MSGB 414A. If the second MSGB-RNTI is associated with the PRACH occasion in which the RA preamble is transmitted by the UE, the UE may successfully decode the DCI 422A and then receive the MSGB 424A.

Figure 4B:
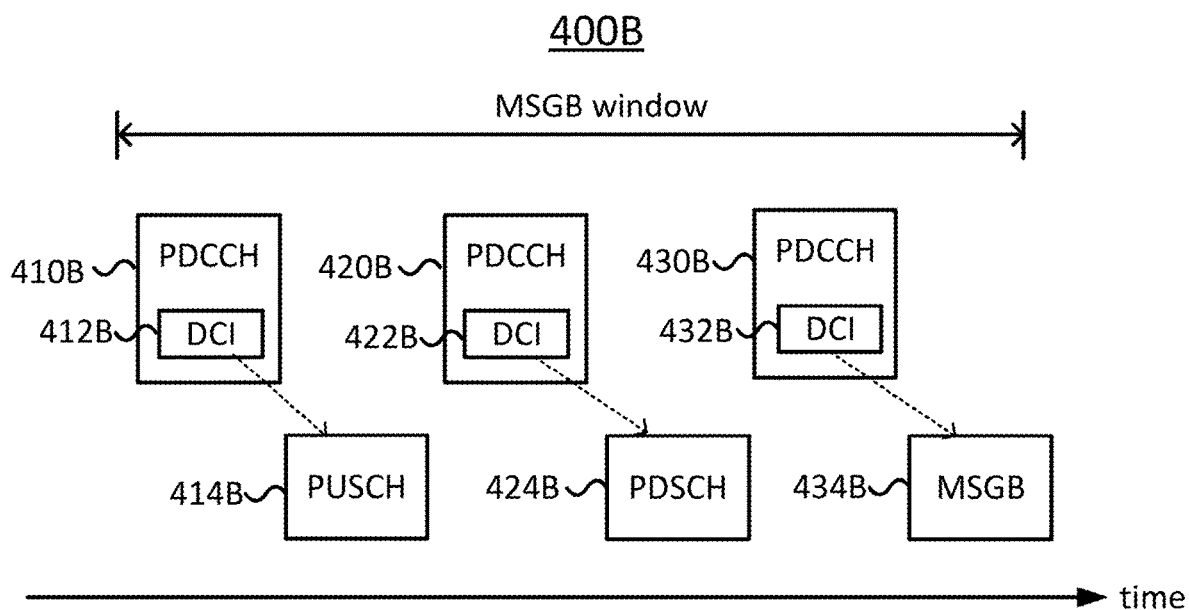
FIG. 4B illustrates a process of MSGB reception when payload of MSGA includes a C-RNTI MAC CE according to an example implementation of the present disclosure.

FIG. 4B illustrates a process 400B of MSGB reception when payload of MSGA includes a C-RNTI MAC CE according to an example implementation of the present disclosure. In this implementation the MSGA transmission has a payload on PUSCH including a C-RNTI MAC CE, the UE may additionally monitor PDCCH for an RAR identified by the C-RNTI within the MSGB window. Specifically, the UE may monitor PDCCHs (including PDCCH 410B, PDCCH 420B, PDCCH 430B) for an RAR identified by the MSGB-RNTI and monitor the PDCCHs for an RAR identified by the C-RNTI within the MSGB window. For example, DCI 412B with CRC bits scrambled by a first C-RNTI includes a UL grant that schedules a PUSCH 414B. DCI 422B with CRC bits scrambled by a second C-RNTI includes a DL assignment that schedules a PDSCH 424B. The second C-RNTI may be the same as the first C-RNTI if both the DCI 412B and the DCI 422B schedule data transmission for the same UE. The second C-RNTI may be different from the first C-RNTI if the DCI 412B and the DCI 422B schedule data transmission for different UEs. If the first C-RNTI is the same as the C-RNTI used by the UE for PDCCH monitoring, the UE may successfully decode the DCI 412B and then perform UL transmission on the PUSCH 414B. If the second C-RNTI is the same as the C-RNTI used by the UE for PDCCH monitoring, the UE may successfully decode the DCI 422B and then receive the PDSCH 424B, which may include an RAR. In one implementation, the PDSCH 424B may include an absolute timing advance command (TAC) MAC CE (e.g., 12 bits). DCI 432B with CRC bits scrambled by a MSGB-RNTI schedules a MSGB 434B on a PDSCH. If the MSGB-RNTI is associated with the PRACH occasion in which the RA preamble is transmitted by the UE, the UE may successfully decode the DCI 432B and then receive the MSGB 434B, which may include an RAR. In one implementation, the MSGB 434B may include multiple types of MAC subPDU, including a MAC subPDU including success RAR, a MAC subPDU including MAC SDU, a MAC subPDU including fallback RAR, a MAC subPDU including data for CCCH (data of signal radio bearer) and a subPDU including padding (i.e., a padding subPDU).

In one implementation the UE is in an RRC_CONNECTED state. The BS can schedule data transmission, such as PUSCH 414B and PDSCH 424B, based on the C-RNTI MAC CE received in the MSGA transmission. Because the C-RNTI is UE specific, communication using the C-RNTI can avoid collision with other UEs that may occur in communication using the MSGB-RNTI.

Referring back to FIG. 2B, in action 218B, the UE performs contention resolution. Once a MSGB is received, the UE performs contention resolution according to one or more MAC subPDU contained in the MAC PDU of the MSGB. In a case where the MSGA transmission with payload on PUSCH includes a C-RNTI MAC CE, the MSGB may either be indicated by a downlink assignment received on the PDCCH identified by the MSGB-RNTI or C-RNTI. In a case where the MSGA transmission with payload on PUSCH includes MAC SDU from CCCH, the MSGB may only be indicated by a downlink assignment received on the PDCCH identified by the MSGB-RNTI.

For a UE that includes the C-RNTI MAC CE in the MSGA transmission, the condition of contention resolution may be different depending on whether the UE has a valid timing advance value or not (time alignment timer is running or not). For example, the condition of contention resolution for a UE that has a valid timing advance value may be that a PDCCH is received and the PDCCH is addressed to the C-RNTI and contains a UL grant for a new transmission. The condition of contention resolution for a UE that does not has a valid timing advance value may be that a PDCCH is received and the PDCCH is addressed to the C-RNTI and contains a newly defined timing advance MAC CE.

A MAC PDU of the MSGB may include multiple types of MAC subPDU, including a MAC subPDU including success RAR, a MAC subPDU including MAC SDU, a MAC subPDU including fallback RAR, a MAC subPDU including data for CCCH (data of signal radio bearer) and a subPDU including padding (i.e., a padding subPDU). Different types of MAC subPDU may be identified by different subheaders.

Figure 5:
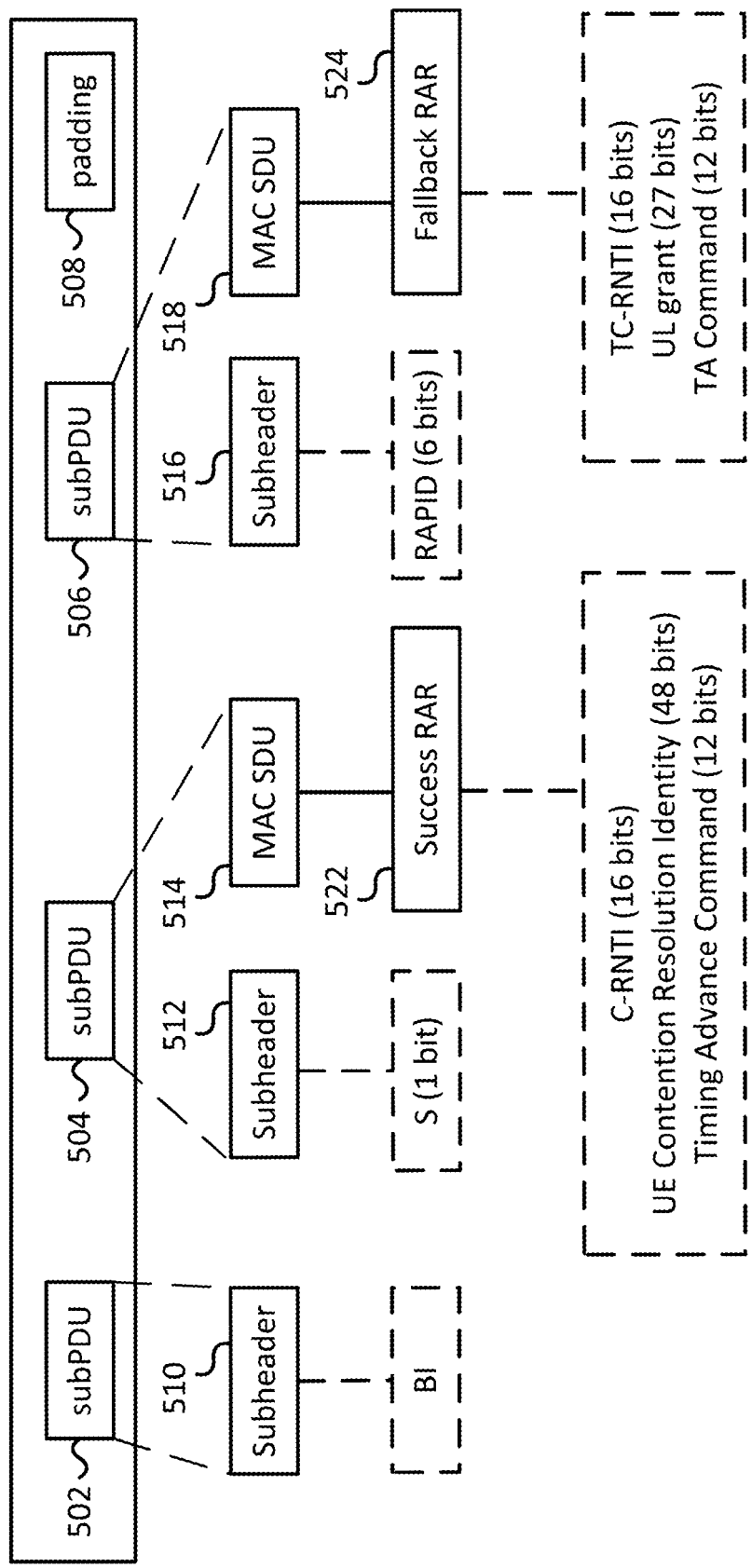
FIG. 5 illustrates multiple types of MAC subPDU that may be present in a MSGB according to an example implementation of the present disclosure.

FIG. 5 illustrates multiple types of MAC subPDU that may be present in a MSGB 500 according to an example implementation of the present disclosure. A MAC subPDU 502 includes a subheader 510 including backoff indicator (BI). A MAC subPDU 504 includes a subheader 512 and a MAC SDU 514 corresponding to a success RAR 522. A MAC subPDU 506 includes a subheader 516 and a MAC SDU 518 corresponding to a fallback RAR 524.

In one implementation, the subPDU 504 including the success RAR 522 may be identified by a success RAR specific indicator or a specific field in the subheader 512. The specific field may implicitly indicate the corresponding MAC SDU via a predefined mapping rule. In one implementation, the specific field set to "0" means that the corresponding MAC SDU is a success RAR, and the specific field set to "1" means that the corresponding MAC SDU is a fallback RAR.

In one implementation, the MAC SDU 514 corresponding to the success RAR 522 may include C-RNTI (e.g., 16 bits), UE contention resolution identity (e.g., 48 bits), and/or timing advance command or information (e.g., 12 bits). If a CCCH SDU is included in the MSGA and the UE contention resolution identity in the MAC SDU 514 matches the CCCH SDU, the MAC entity of the UE may set the C-RNTI to the value received in the success RAR 522 and then consider the RAR reception successful. The UE then proceeds to perform action 220 completion of the RA procedure. In one implementation, the UE may stop the MSGB window.

In one implementation, the subheader 512 of the subPDU 504 corresponding to the success RAR 522 may include a specific field S (e.g., 1 bit). The gNB may indicate to the UE (which tends to receive the success RAR for contention resolution) via the specific field S whether the MSGB also includes other subPDU that the UE needs to receive/decode. For example, the specific field S may indicate that there is another subPDU to be received following the subPDU with the success RAR. In one implementation, the specific field S may be included in the MAC SDU 514 of the subPDU 504 corresponding to the success RAR 522.

In one implementation, the MAC subPDU 506 including the fallback RAR 524 may be identified by a specific field in the subheader 516. The specific field may implicitly indicate the corresponding MAC SDU via a predefined mapping rule. In one implementation, the specific field set to "0" means that the corresponding MAC SDU is a success RAR, and the specific field set to "1" means that the corresponding MAC SDU is a fallback RAR.

In one implementation, the subheader 516 may also include a Random Access Preamble Identity (RAPID) field (e.g., 6 bits), which indicates that the corresponding MAC SDU 518 is associated with a preamble transmission identified by the RAPID. In one implementation, the MAC SDU 518 may include Temporary C-RNTI (TC-RNTI as defined in 3GPP TS 38.321) (e.g., 16 bits), a UL grant (e.g., 27 bits) and a timing advance command (e.g., 12 bits). If the RAPID in the MAC subPDU 506 matches the transmitted preamble, the MAC entity of the UE considers the RAR reception successful. In one implementation, the UE may stop the MSGB window. The UE then proceeds to perform action 216C illustrated in FIG. 2C (arrow 256 illustrated in FIG. 2B, fallback from a 2-step RA to a 4-step RA). In action 216C, the UE performs MSG3 transmission based on the TC-RNTI and the UL grant indicated by the fallback RAR 524.

In one implementation, the UE may receive no RAR that matches the transmitted MSGA or there may be no RAR that achieves successful contention resolution. If the UE does not receive success RAR/fallback RAR that matches (is addressed to) the MSGA transmission within the MSGB window, the UE may perform random backoff (arrow 252 illustrated in FIG. 2B, contention resolution failure) according to the BI received in the MAC subPDU 502 or a default BI and then go back to action 210B.

In one implementation, the gNB may configure the UE with a parameter indicating the maximum number of MSGA transmissions (e.g., msgATransMax). If the number of preamble transmission reaches the msgATransMax and the UE still fails the contention resolution in action 218B, the UE may proceed to perform action 210C illustrated in FIG. 2C (arrow 254 illustrated in FIG. 2B, fallback from the 2-step RA to the 4-step RA after multiple times of MSGA transmissions). In one implementation, the UE may release the BI value received from the MSGB upon fallback from action 218B to action 210C. In one implementation, the UE may set the backoff window size to zero upon fallback from action 218B to action 210C. In action 220 illustrated in FIG. 2A, the MAC entity of the UE considers the RA procedure successfully completed.

Actions 208C, 210C, 212C, 214C, 216C and 218C illustrated in FIG. 2C are similar to the 4-step RA procedure defined in 3GPP specifications (e.g., 3GPP TS 38.321). In action 214C, if the UE does not successfully receive the RAR, the UE may go back to action 210C for RA resource selection (arrow 262 illustrated in FIG. 2C, no RAR). If the UE chooses to perform the 4-step RA in action 206 illustrated in FIG. 2A and fails in contention resolution in action 218C, the UE may go back to action 210C for RA resource selection (arrow 264 illustrated in FIG. 2C, the 4-step RA and contention resolution failure). If the UE chooses to perform the 2-step RA in action 206 illustrated in FIG. 2A, receives a fallback RAR, performs MSG3 transmission in action 216C scheduled by the MSGB of the 2-step RA received in action 216B, and fails in contention resolution in action 218C, the UE may proceed to perform action 210B for RA resource selection (arrow 266 illustrated in FIG. 2C, fallback from the 2-step RA and contention resolution failure).

Actions illustrated in FIG. 2A, FIG. 2B and FIG. 2C should not be construed as necessarily order dependent. The sequence of the actions may be changed or reordered in some implementations. Moreover, not all the actions may need to be completely executed. Some of the actions may be omitted in some implementations.

In NR, three RRC states are supported: RRC_CONNECTED, RRC_IDLE and RRC_INACTIVE. A UE (or the UE's RRC layer) may be in one of the three RRC states. Except for the UL data transmission during an RA procedure (e.g., UL data transmitted in MSG3 or MSGA), in general, UL data transmission is only allowed to be performed by the UE in the RRC_CONNECTED state. The UL data transmission in the present disclosure means that a UE transmits data to a BS (e.g., a gNB) and the data may be transmitted on a PUSCH or some other physical uplink channel(s)). In a legacy RA procedure, the amount of data that can be carried by MSGA or MSG3 are limited. Specifically, the PUSCH resource granted by the gNB for the MSGA and MSG3 transmission may be mainly for data from a CCCH (data oriented from the RRC layer). Once the UE needs to transmit uplink data (e.g., data not from the CCCH) to the gNB and the UE is not in RRC_CONNECTED (e.g., RRC_IDLE or RRC_INACTIVE), even though the amount of data is small, the UE still needs to trigger and perform an RRC connection establishment or RRC connection resume procedure for transitioning to the RRC_CONNECTED state. Consequently, infrequent small uplink data transmission by the UE may result in considerable power consumption spent on the signaling overhead applied for the RRC state transition. Therefore, from the UE's power-saving perspective, it is beneficial to introduce some new mechanisms to the UE for performing small data transmission while in RRC_INACTIVE and/or RRC_IDLE without the RRC state transition. More specifically, the mechanism may also support small data transmission through the RA procedure and/or through the configured grant. The small data in the present disclosure may be the data from a logical channel associated with any of SRB and/or DRB. Several implementations of the mechanism that supports a UE to transmit small data via the RA procedure and/or the configured grant are disclosed.

Several mechanisms (implementations) for supporting a UE to transmit data via a random access procedure and/or a configured grant while the UE is not in RRC_CONNECTED (e.g., in RRC_INACTIVE or RRC_IDLE) are disclosed. In one implementation, data may be contained in the MSGA of a 2-step RA procedure, in the MSG3 of a 4-step RA procedure, in one or more transport block (TB) transmitted on some other PUSCH resources granted by the gNB during the RA procedure, or in one or more TB transmitted on some other PUSCH resources granted by the gNB for subsequent transmission (e.g., UL data transmission after the MSGA or MSG3). In one implementation, the data may be contained in one or more TB transmitted on the PUSCH resources granted by the gNB via a configured grant configuration. The disclosed mechanisms for supporting data transmission via the random access procedure are based on the model of the random access procedure disclosed previously. The disclosed mechanism(s) may be applied by the UE to transmit data of any size.

Issue #1 RRC suspension

Figure 6:
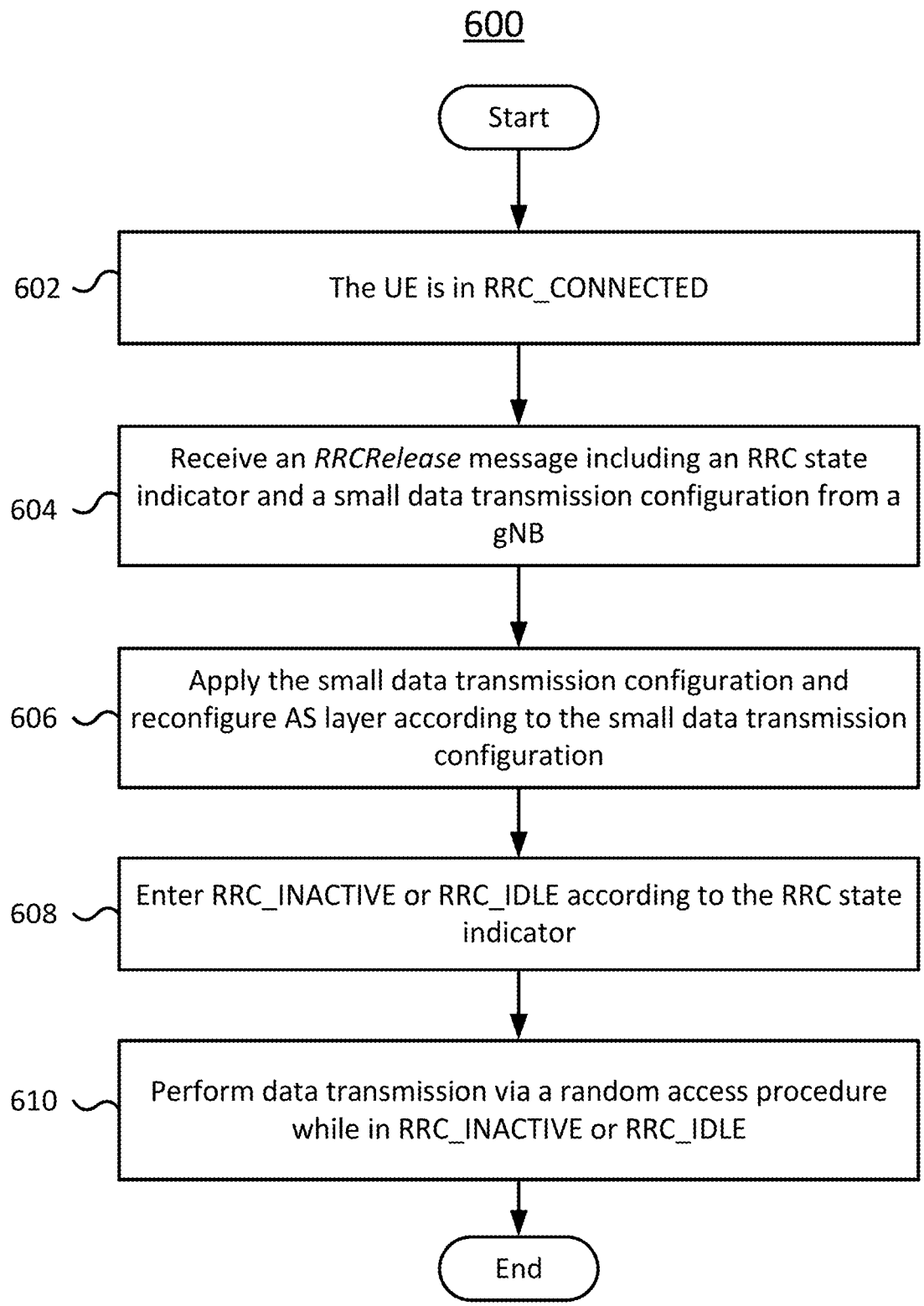
FIG. 6 illustrates a procedure of small data transmission performed by a UE in RRC_INACTIVE or RRC_IDLE according to an example implementation of the present disclosure.

FIG. 6 illustrates a procedure 600 of small data transmission performed by a UE in RRC_INACTIVE or RRC_IDLE according to an example implementation of the present disclosure. In action 602, the UE is in RRC_CONNECTED. In action 604, the UE receives an RRCRelease message including an RRC state indicator and a small data transmission configuration from a gNB. Within a RAN of NR, by transmitting a DL RRC message (e.g., RRCRelease) to the UE in RRC_CONNECTED, the gNB may initiate an RRC connection release procedure to transit the UE in RRC_CONNECTED to RRC_IDLE or RRC_INACTIVE. The DL RRC message, also referred to as the RRC Release message or the RRCRelease message in the present disclosure, may include an RRC state indicator (e.g., State_Indicator) indicating which RRC state (e.g., RRC_INACTIVE or RRC_IDLE) the UE transitions to. Furthermore, the RRCRelease message may also include a small data transmission configuration (e.g., SD_Config) that provides the configuration to the UE for data transmission in RRC_INACTIVE or RRC_IDLE.

After receiving the RRCRelease message, in action 606, the UE may apply the small data transmission configuration (e.g., SD_Config) and reconfigure its AS layer (e.g., MAC, RLC, PDCP and/or SDAP layer(s)) according to the small data transmission configuration (e.g., SD_Config) contained in the RRCRelease message. Afterward, in action 608, the UE may enter RRC_INACTIVE or RRC_IDLE according to the RRC state indicator (e.g., State_Indicator) contained in the received RRCRelease message. In action 610, the UE performs data transmission while in RRC_INACTIVE or RRC_IDLE via a random access procedure according to the SD_Config contained in the received RRCRelease message, when needed.

In one implementation, the RRC state indicator may be implemented in an implicit way. For example, an SD_Config contained in a SuspendConfig may indicate that the UE may enter RRC_INACTIVE and perform data transmission via random access while in RRC_INACTIVE. On the other hand, the UE may enter RRC_IDLE and perform data transmission via random access while in RRC_IDLE if the SD_Config is not contained in the SuspendConfig but in the RRCRelease message.

The small data transmission via the random access procedure in the present disclosure may be interpreted as: the UE performs UL data transmission on a PUSCH by initiating an RA procedure, performs corresponding UL data transmission within the MSGA/MSG3, or performs UL data transmission on a PUSCH after the RA procedure or after the reception of MSGB/MSG4 (which may be referred to as subsequent transmission or subsequent data transmission).

Issue #2 Small Data Transmission Configuration

As illustrated in action 604 and action 606 in FIG. 6, a gNB may provide a specific configuration (e.g., SD_Config) to the UE via a DL RRC message (e.g., RRCRelease) for supporting small data transmission. The SD_Config may include one or more following IE/indicator/field:

An indicator indicating one or more UL/DL BWP applied by the UE for performing the data transmission via the random access procedure. In one implementation, the small data transmission configuration indicates a UL BWP on which the small data transmission is to be performed. During an RRC connection release procedure, while the UE in RRC_Connected, the UE may be configured with one or multiple UL and DL BWP(s) by the gNB. In NR, the RA resource may be configured on multiple UL BWPs. Considering system load balancing among those UL BWPs, it may be beneficial for the gNB to indicate to the UE that the data transmission via RA in RRC_Inactive and/or RRC_Idle can only be performed on a specific UL BWP(s). In one implementation, the SD_Config may include an indicator indicating one or more UL/DL BWP that may be applied by the UE to perform the data transmission via the random access procedure. In other words, the UE may be only allowed to perform small data transmission via the random access procedure on the one or more UL/DL BWP indicated by the gNB. Some implementations regarding the indicator indicating one or more UL/DL BWP are disclosed as follows.

In one implementation, the one or more indicated UL/DL BWP may be the UL/DL BWP configured by the gNB for data transmission and reception while the UE in RRC_CONNECTED. In one implementation, the one or more indicated UL/DL BWP may not be the UL/DL BWP configured by the gNB for data transmission and reception while the UE in RRC_CONNECTED. For example, the one or more indicated UL/DL BWP may be different from the four configured BWPs used in the RRC_CONNECTED state.

The indicator may be explicitly represented as an identifier of a BWP.

The indicator may be implicitly represented as one or more BWP-related IE as defined in the 3GPP TS 38.331 and TS 38.321, including defaultDownlinkBWP-Id, initialDownlinkBWP, firstActiveDownlinkBWP-Id, initialUplinkBWP, firstActiveUplinkBWP-Id. Specifically, the gNB may implicitly indicate one or more BWP for small data transmission via RA to the UE via the one or more IE listed above. In one implementation, the one or more BWP for small data transmission via RA is the BWP indicated by the initialUplinkBWP and/or initialDownlinkBWP.

The indicator may be implicitly represented as one BWP that has the smallest or the largest BWP ID among the configured BWPs while in RRC_CONNECTED.

The indicator may be implicitly represented as one BWP that is configured with (2-step RA specific) random access resource configuration.

The indicator may be implicitly represented as one BWP that is configured with PUSCH resource configuration for payload of MSGA transmission.

The indicator may be implicitly represented as one BWP that is configured with (2-step RA specific) random access resource configuration for supporting the small data transmission.

The indicator may be implicitly represented as whether a BWP is configured with a dedicated PRACH resource and corresponding PUSCH resource for corresponding preamble, MSGA and small data transmission. It should be noted that the dedicated resource may be dedicated for a specific UE or shared by multiple UEs.

The indicator may be implicitly represented as one or more RACH IE as defined in the 3 GPP TS 38.331 and TS 38.321, including RACH-ConfigCommon, RACH-Config-Generic, RACH-ConfigDedicated, Specifically, the gNB may implicitly indicate one or more BWP for small data transmission via RA to the UE via the one or more IE listed above. In one implementation, the one or more BWP for small data transmission is the BWP configured with RACH-ConfigCommon and/or RACH-ConfigGeneric and/or RACH-ConfigDedicated.

The indicator may be implicitly represented as a DL BWP that has the same ID as a UL BWP indicated by any of the implementations disclosed previously.

The indicator may be implicitly represented as a DL BWP that is configured with a specific set of DL reference signals.

An indicator indicating a priority order of multiple BWPs. The multiple BWPs may or may not be indicated by the gNB through any of the implementations disclosed previously in section (a). For example, there are three BWPs, including $BWP_1$, $BWP_2$, $BWP_3$, indicated by the gNB for small data transmission via RA. The gNB further indicates a priority order among the $BWP_1$, $BWP_2$, $BWP_3$ for the small data transmission via RA. When the UE tends to perform small data transmission via RA, the UE may start to perform small data transmission via RA on the BWP having the top priority according to the priority order. Some implementations regarding the indicator indicating the priority order are disclosed as follows.

The multiple BWPs may or may not be limited to the BWP indicated by the gNB through the indicator disclosed previously in section (a).

The UE may perform small data transmission via the RA procedure among the multiple BWPs sequentially according to the priority order.

More specifically to the implementation above, the UE may switch to another BWP for the small data transmission via RA based on the received priority order (for example, the UE may switch from a BWP having the highest priority to another BWP having the second-highest priority) when one or more events listed below occurs:

An indicator (e.g., a BWP switch indicator) is received from the gNB. The indicator may be contained in: a DCI field, a DCI with CRC bits scrambled by a (pre-configured/pre-defined) RNTI, a (DL) MAC PDU, a MAC subPDU, a (sub)header of a MAC subPDU, a DL MAC CE, an MSGB, a DCI that schedules a PDSCH reception corresponding to the MSGB, a MAC PDU of the MSGB, a subPDU within the MAC PDU of the MSGB, a fallback RAR within the MSGB, a success RAR within the MSGB, a (sub)header of a fallback RAR within the MSGB, a (sub)header of a success RAR within the MSGB, and/or a (sub)header of a subPDU of a MAC PDU of the MSGB.

An indicator is received from the gNB in response to the small data transmission via random access.

An indicator is received from the gNB through broadcast signaling.

The small data transmission via the RA procedure on a BWP is temporally/currently prohibited by the gNB, where the prohibited BWP may be configured by the gNB via a unicast DL RRC message and/or broadcast by the gNB via system information. For example, the gNB may indicate whether small data transmission via the RA procedure is currently allowed on a BWP or not. If small data transmission via the RA procedure is not allowed on a BWP, the UE may stop the RA procedure for small data transmission on the corresponding BWP and initiate another RA procedure for small data transmission on another BWP.

A maximum number of RA preamble transmissions corresponding to the BWP is reached.

An indicator indicating the number of repetitions to be performed by the UE for transmission of the small data, the payload of the MSGA, and/or the preamble of the MSGA. When the UE performs transmission of the small data, the payload of the MSGA, and/or the preamble of the MSGA, the UE may repeat the transmission of TB corresponding to the small data, the payload of the MSGA on the PUSCH, and/or the preamble of the MSGA for the number of times indicated by the indicator.

An indicator indicating a PUSCH configuration for the small data and/or the payload of MSGA transmission. The PUSCH configuration may include at least one or more parameter listed below:

mcs-Table: Indicates the MCS table the UE shall use for PUSCH without transform precoding.

pusch-TimeDomainAllocationList: List of time domain allocations for timing of UL assignment to UL data (as defined in TS 38.214).

An indicator indicating a PUSCH configuration among a list of (multiple) preconfigured PUSCH configurations.

The PUSCH configuration indicated by the indicator may be applied by the UE for the small data transmission.

The PUSCH configuration indicates some physical resources that may be applied by the UE for the small data transmission. For example, the PUSCH configuration indicates a PUSCH resource for MSGA transmission, which contains small data.

The list of pre-configured PUSCH configurations may be transmitted from the gNB to the UE via a DL RRC message while the UE is in RRC_CONNECTED. For example, the gNB may provide a set of three PUSCH configurations and the indicator may indicate one of the three configurations through the SD_Config.

Each PUSCH configuration among the list of PUSCH configurations may be associated with a set of PUSCH resources on a UL BWP among multiple configured UL BWPs, respectively.

Each PUSCH configuration among the list of PUSCH configurations may be associated with a set of PUSCH resources on a (serving) cell among multiple configured (serving) cells, respectively.

An indicator indicating a PRACH configuration among a list of (multiple) preconfigured PRACH configurations.

The PRACH configuration indicated by the indicator may be applied by the UE for the small data transmission via random access procedure.

The PRACH configuration may indicate some physical resources that may be applied by the UE for the small data transmission via random access procedure. For example, the PRACH configuration may indicate PRACH and PUSCH resources for MSGA transmission, which contains small data.

The list of preconfigured PRACH configurations may be transmitted from the gNB to the UE via a DL RRC message while the UE is in RRC_CONNECTED. For example, the gNB may provide a set of three PRACH configurations and the indicator may indicate one of the three configurations through the SD_Config.

Each PRACH configuration among the list of PRACH configurations may be associated with a set of PRACH resources on a UL BWP among multiple configured UL BWPs, respectively.

Each PRACH configuration among the list of PRACH configurations may be associated with a set of PRACH resources on a (serving) cell among multiple configured (serving) cells, respectively.

An indicator indicating a maximum size of a TB/data that can be transmission on a BWP and/or cell via the RA procedure. In one implementation, the small data transmission configuration indicates a data volume threshold for the small data transmission to be performed via the RA procedure.

An indicator/configuration indicating one or more radio bearers that may be retained (e.g., not released) while performing the RRC release procedure. In one implementation, the small data transmission configuration (e.g., SD_Config) indicates at least one radio bearer to be retained for supporting the small data transmission. In one implementation, the small data transmission configuration (e.g., SD_Config) indicates at least one radio bearer to be applied while performing the small data transmission via the RA procedure. In one implementation, the small data transmission configuration indicates at least one radio bearer to be retained while transitioning from the RRC_CONNECTED state to one of the RRC_INACTIVE state and the RRC_IDLE state. In one implementation, the UE may suspend all SRB(s) and DRB(s) except SRB0 and the radio bearer that is indicated to be retained by the small data transmission configuration (e.g., SD_Config) when performing small data transmission via the RA procedure.

A set of configurations providing some configurations that may need to be applied by the UE for a MAC procedure/process for accomplishing the small data transmission via the RA procedure. For example, the small data transmission configuration may include parameters to be applied for the MAC procedure/process when the UE is in RRC_INACTIVE or RRC_IDLE. The MAC procedure/process may include one or more item listed below:

Logical channel prioritization procedure.
Random Access procedure.
Uplink shared channel data transfer procedure.
HARQ process of the Uplink shared channel data transfer procedure.
Buffer status report procedure.

One or more indicators indicating which set of configurations to be applied when one or multiple sets of configurations are preconfigured by the gNB before initiating the RRC release procedure.

A configuration that configures a specific logical channel prioritization (LCP) restriction (e.g., smalldata_allowance) for one or multiple or all of the configured logical channels configured for RRC_CONNECTED. In one implementation, the small data transmission configuration indicates an LCP restriction to be applied by the UE while performing the small data transmission via the RA procedure. The specific LCP restriction (e.g., smalldata_allowance) may be configured per logical channel by the gNB (via the SD_Config). For example, when the UE in RRC_INACTIVE and the UE is performing a multiplexing and assembly (M&A) procedure to prepare a MAC PDU for the small data transmission via the RA procedure, the MAC entity of the UE may only select the logical channel that is configured with the smalldata_allowance to join the M&A and LCP procedure.

An indicator indicating an access category and/or an access identity permitted for small data transmission via the RA procedure. In one implementation, the small data transmission configuration indicates at least one of an access category for the small data transmission and an access identity for the small data transmission. In one implementation, the indicator may further indicate a set of permitted access categories explicitly. In one implementation, the indicator may indicate a specific value, where an access category may be considered permitted if the ID of the access category is smaller than the specific value.

Issue #3 Allowance of Small Data Transmission

As illustrated in action 610, after applying the SD_Config received from the gNB and entering RRC_INACTIVE or RRC_IDLE, the UE may perform data transmission via the RA procedure. However, from a perspective of traffic control and radio resource management on the gNB side, the gNB may control whether the UE is allowed to trigger and/or perform small data transmission via the RA procedure in one implementation. In other words, before the UE triggers small data transmission via the RA procedure, the UE may check/determine whether the small data transmission via the RA procedure is allowed by the gNB on a serving cell and/or BWP.

Figure 7:
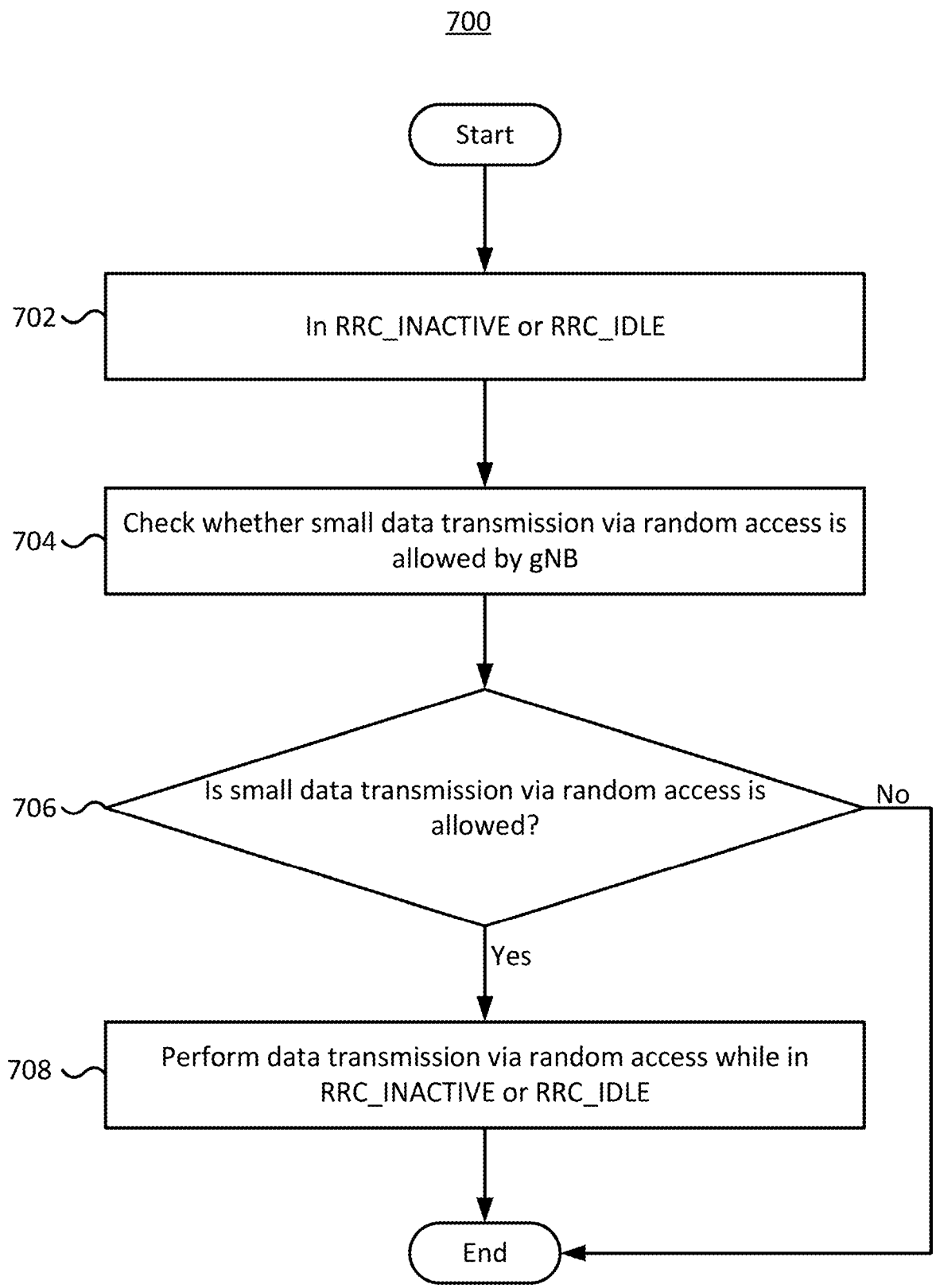
FIG. 7 illustrates a procedure for controlling small data transmission according to an example implementation of the present disclosure.

FIG. 7 illustrates a procedure 700 for controlling small data transmission according to an example implementation of the present disclosure. In action 702, the UE is in RRC RRC_INACTIVE or RRC_IDLE before the UE triggers small data transmission via random access. In action 704, the UE checks whether the small data transmission via random access is allowed by the gNB. In action 706, if the small data transmission via random access is allowed, the UE performs data transmission via random access while in RRC_INACTIVE or RRC_IDLE in action 708; otherwise, the procedure 700 ends. It should be noted that the procedure 700 illustrated in FIG. 7 is exemplary rather than limiting. There may exist more detail for implementing the overall allowance control among the gNB and the UE. Several implementations regarding actions via which the UE checks the allowance of data transmission and how the gNB makes corresponding allowance control are disclosed below.

Figure 8:
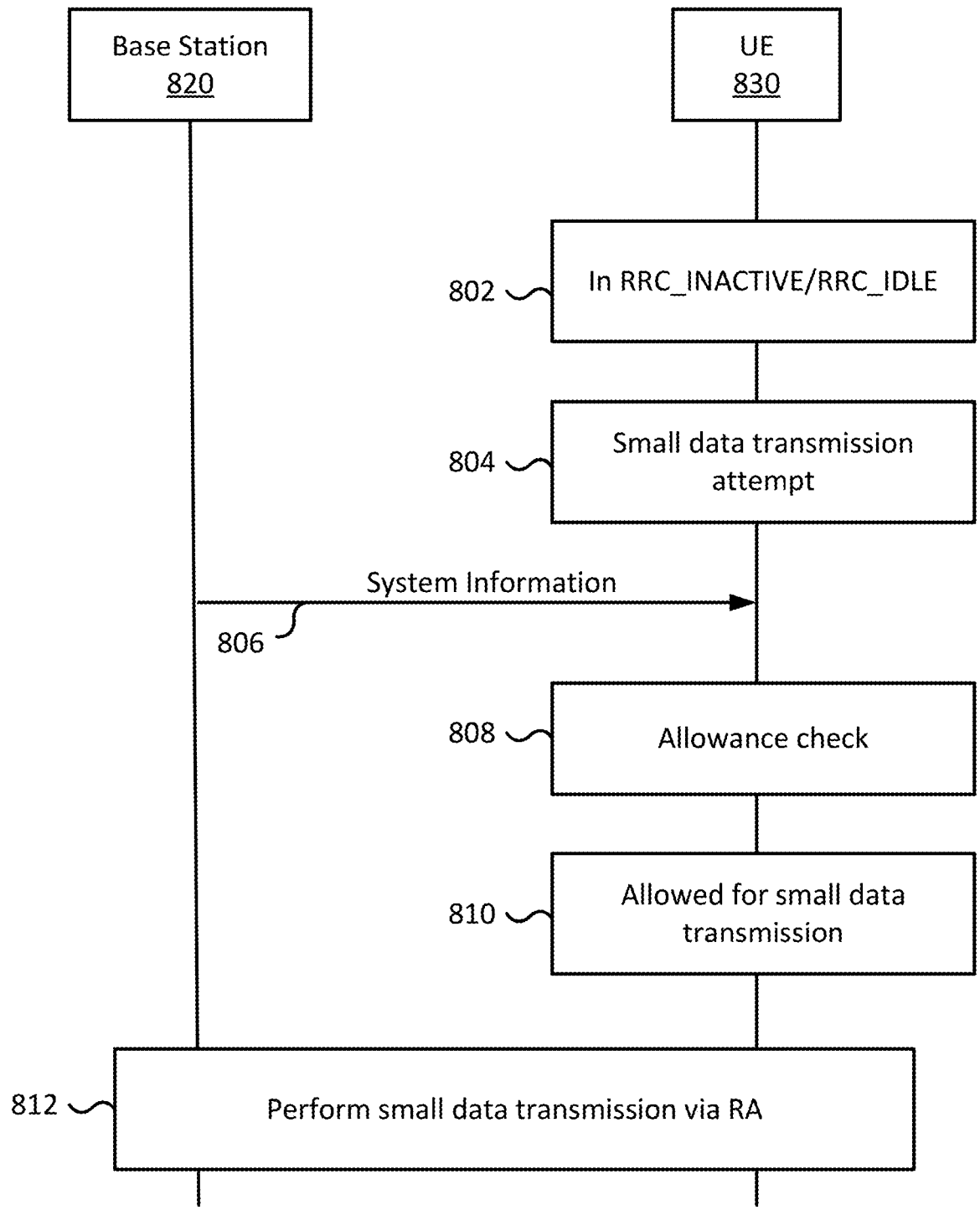
FIG. 8 illustrates a procedure for allowance check and small data transmission according to an example implementation of the present disclosure.

As illustrated in FIG. 7, the UE may need to check whether the small data transmission via random access is allowed by gNB in action 704 after action 702 and before performing small data transmission via random access in action 708. FIG. 8 illustrates a procedure 800 for allowance check and small data transmission according to an example implementation of the present disclosure. In action 802, the UE 830 is in RRC_INACTIVE or RRC_IDLE. In action 804, the UE 830 may internally initiate a small data transmission attempt. In action 808, the UE 830 may perform an allowance check. Once some data becomes available for transmission within the AS layer (e.g., SDAP, PDCP, RLC and MAC sublayers) of the UE 830, the UE 830 may initiate the small data transmission attempt and check allowance accordingly for the generated attempt. In one implementation, the allowance check performed by the UE 830 in action 808 is based on one or more parameters and/or configuration received from the base station 820 (e.g., gNB) via system information (e.g., system information block 1 (SIB1)) in action 806. In action 808, the UE 830 may determine the small data transmission is allowed by the base station 820. In action 810, the UE 830 may perform the small data transmission via the RA procedure.

In one implementation, the allowance check in action 808 toward a first gNB (e.g., the base station 820 illustrated in FIG. 8) may be skipped by a UE in RRC_INACTIVE if the UE has been allowed for small data transmission attempt (specifically, the UE already passed an allowance check) by the first gNB or a second gNB and one or more following conditions is satisfied:

The second gNB belongs to a RAN notification area that is the same as the first gNB. The RAN notification area may be determined by the UE via a ran-NotificationArectInfo contained in the SIB1.

The second gNB belongs to a RAN notification area that is the same as the first gNB and a value tag belonging to the corresponding access category/access identity is not changed. Specifically, the value tag belonging to the corresponding access category/access identity broadcast by the first gNB is the same as the second gNB.

The allowance check in action 808 may be implemented as one or more combinations of implementations disclosed below:

The UE checks whether small data transmission is allowed by the gNB.

The UE checks whether small data transmission in RRC_INACTIVE and/or RRC_IDLE is allowed by the gNB.

The UE checks whether small data transmission on some preconfigured PUSCH resource is allowed by the gNB, where the preconfigured PUSCH resource may be the PUSCH resource configured for transmission of the payload of MSGA. Detailed UE actions of the allowance check in action 808 may be implemented as one or more combinations of implementations disclosed below.

Figure 9:
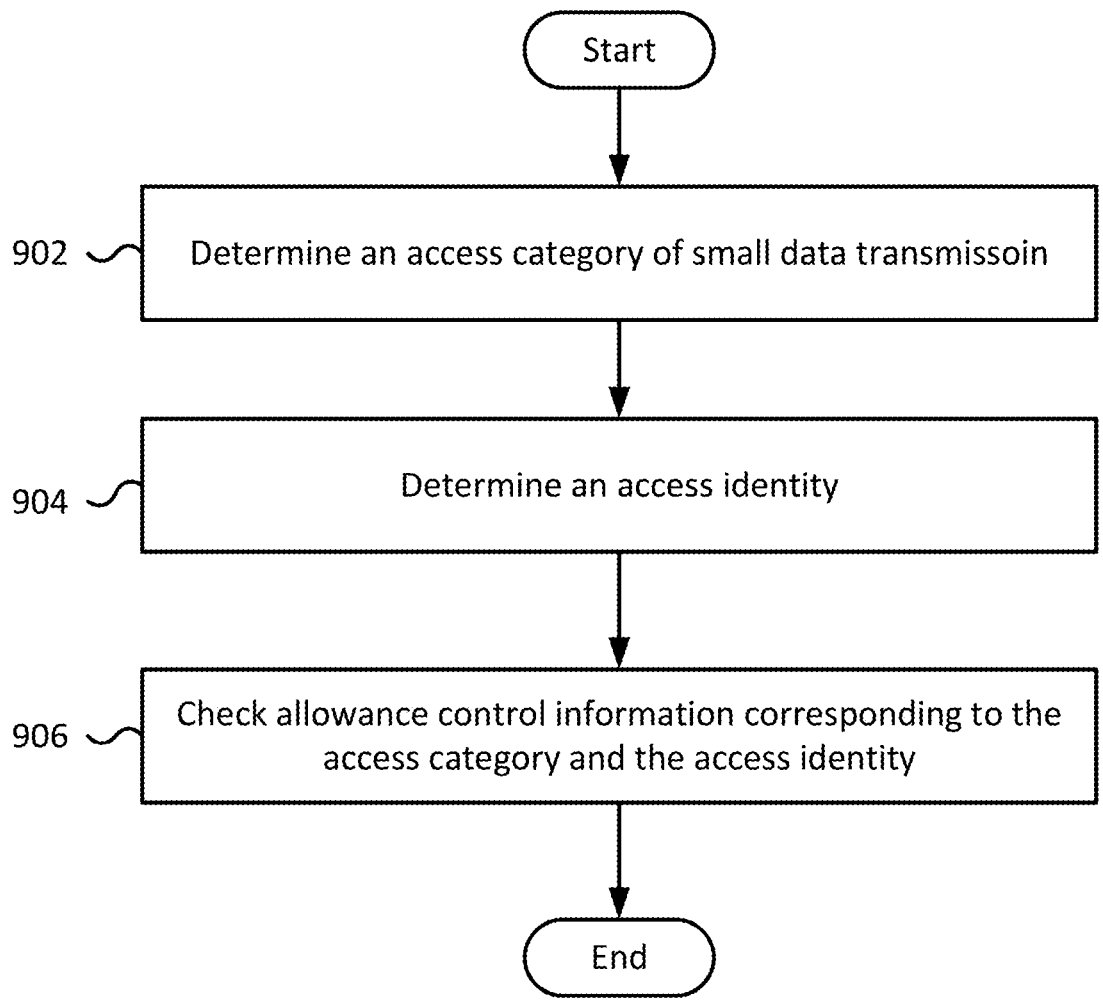
FIG. 9 illustrates an allowance check procedure according to an example implementation of the present disclosure.

FIG. 9 illustrates an allowance check procedure 900 according to an example implementation of the present disclosure. In one implementation, the UE may perform an access barring check based on an access category associated with the small data transmission and an access identity associated with the small data transmission to determine whether the small data transmission is allowed by the BS. As illustrated in FIG. 9, after initiating the small data transmission attempt, the UE may perform the following steps for the allowance check.

In action 902, the UE determines one or multiple access categories from a set of standardized and/or operator-defined access categories associated with the small data transmission attempt. For example, there may be one or more (dedicated) access category predefined/preconfigured to be associated with the access attempt corresponding to the small data transmission. Table 1 illustrates an example mapping table between a type of access attempt and an access category. In one implementation, the UE may determine the access category based on a predefined/preconfigured mapping table, such as Table 1.

TABLE 1 a mapping table between an access attempt and an access category

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling on NAS level resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8 | All except for the conditions in Access Category 1 | MO signalling on RRC level resulting from other than paging |
| 9 | | MO data via random access |
| 10-31 | | Reserved standardized Access Categories |
| 32-63 | All | Based on operator classification |

PLMN in Table 1 means public land mobile network, HPLMN in Table 1 means home PLMN, MO in Table 1 means mobile originated, SMS in Table 1 means short message service, and MMTEL in Table 1 means multimedia telephony service. In one implementation, a specific access category (e.g., access category number 9 in Table 1) may be dedicated for MO data via random access.

Some implementations regarding action 902 are disclosed below.

Introduce a new type of access attempt dedicated for small data transmission via random access, and the type of access attempt is associated with a corresponding dedicated access category (e.g., access category number 9 in Table 1).

Introduce a new type of access attempt dedicated for small data transmission via random access on a specific cell (e.g., PCell, SpCell or SCell), and the type of access attempt is associated with a corresponding dedicated access category (e.g., access category number 9 in Table 1).

Introduce a new type of access attempt dedicated for small data transmission via random access on a specific BWP, and the type of access attempt is associated with a corresponding dedicated access category (e.g., access category number 9 in Table 1). Specifically, once the UE initiates a small data transmission attempt on the specific BWP, the UE sets the access category as the access category associated with the type of access attempt. The specific BWP may be:

a BWP indicated (preconfigured) by the gNB;
a BWP indicated by the gNB via the SD_Config;
a BWP indicated by the gNB via the RRCRelease;
a BWP indicated by an RRC IE initialUplinkBWP;
a BWP indicated by an RRC IE firstActiveUplinkBWP-Id;
a BWP indicated by an RRC IE defaultDownlinkBWP-Id;
a BWP indicated by an RRC IE initialDownlinkBWP;
a BWP indicated by an RRC IE firstActiveDownlinkBWP-Id;
a BWP indicated by the gNB via the implementation introduced in the section corresponding to Issue #2;
a BWP corresponding to a specific SCS.

Introduce a new type of access attempt dedicated for the small data transmission in which the data (TB) to be transmitted satisfies a specific condition. The specific condition may be:

The size of the TB is smaller than (or equal to) a specific threshold.

The size of the TB is larger than (or equal to) a specific threshold.

The MAC PDU of the TB contains a specific MAC subPDU.

The MAC PDU of the TB contains a specific MAC SDU.

The MAC PDU of the TB contains a MAC SDU from a specific logical channel.

The MAC PDU of the TB contains a MAC SDU from a logical channel associated with a specific radio bearer (e.g., SRB0, SRB1, SRB2, or SRB3).

The MAC PDU of the TB contains a specific MAC subPDU containing a specific type of UL MAC CE, such as a BSR MAC CE or C-RNTI MAC CE.

In action 904, the UE may determine one or more access identities from a set of predefined (standardized) access identities associated with the small data transmission attempt. Table 2 illustrates an example mapping table between a type of access class and an access identity. In one implementation, the UE may determine the access identity based on a predefined/preconfigured mapping table, such as Table 2.

TABLE 2 a mapping table between an access class and an access identity

| Access Identity number | UE configuration |
|---|---|
| 0 | UE is not configured with any parameters from this table. |
| 1 | UE is configured for multimedia priority service. |
| 2 | UE is configured for mission critical service. |
| 3 | UE is configured with small data transmission via random access service. |
| 4-10 | Reserved |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

Some implementations regarding action 904 are: Introduce a new access identity dedicated for small data transmission via random access (e.g., access identity number 3 in Table 2), and the type of access attempt is associated with a corresponding dedicated access category.

In action 906, the UE may check allowance control information corresponding to the access category and the access identity. The allowance control information may be broadcast by the gNB via system information (e.g., SIB1). The allowance control information may contain some specific parameters, such as a bitmap. Each bit of the bitmap may be associated with one access identity listed in Table 2. The gNB may indicate to the UE whether the small data transmission via RA is allowed by a bit in the bitmap associated with the access identity introduced for the small data transmission via RA. In one implementation, the bit set to "1" may indicate that the small data transmission is allowed, and the bit set to "0" may indicate that the small data transmission via RA is not allowed or the UE may need to further check some other barring parameters contained in the system information to determine whether the small data transmission via RA is allowed. The barring parameters may include BarringFactor and Barringtime as defined in the 3GPP TS 38.331. The parameter BarringFactor indicates the probability that an access attempt would be allowed during an access barring check. The parameter Barringtime indicates the minimum time (interval) before a new access attempt is to be performed after an access attempt is barred during an access barring check for the same access category.

In one implementation, the gNB may indicate to the UE whether the small data transmission via RA is allowed by an indicator associated with the access category introduced for the small data transmission via RA, where the indicator may be transmitted in system information (e.g., SIB1).

According to the implementation, the indicator may be applied by the gNB to indicate to the UE which set of barring parameters should be applied by the UE for the corresponding access category.

According to the implementation, the access attempt corresponding to an access category is considered as allowed by the gNB if the indicator does not indicate a set of barring parameters for the corresponding access category.

According to Issue #3, the allowance control related configuration may contain one or more parameters listed below:

A specific bitmap indicating whether each configured BWP is allowed to perform small data transmission via RA or not.

A parameter indicating the maximum TB size allowed for the small data transmission via RA.

A parameter indicating the maximum TB size allowed for the small data transmission via RA for each configured BWP.

According to Issue #3, detailed UE actions of the allowance check in action 808 illustrated in FIG. 8 may also be implemented as there is no (dedicated) access category predefined/preconfigured to be associated with the access attempt corresponding to the small data transmission. For example, there may be no specific access category dedicated for the small data transmission via RA, but there may be a specific access identity dedicated for the small data transmission via RA. In one implementation, in action 902 illustrated in FIG. 9, the UE may determine an access category based on other types of access attempts. Action 904 and action 906 may be based on the implementations disclosed in Issue #3.

In one or more embodiment, one or more access categories and/or access identities associated with different payload sizes of the MSGA and/or different levels of reliability corresponding to the TB transmission of the MSGA may be introduced.

Issue #4 Preventing Frequent Small Data Transmission

In legacy NR, a UE in RRC_CONNECTED may sequentially trigger a BSR, a scheduling request (SR) and a random access procedure for requesting UL radio resource for UL data transmission once there is any data available for transmission in the UE's PDCP, RLC and/or MAC layer. However, if the UE is configured with the SD_Config and after the UE enters RRC_INACTIVE, the UE may initiate a random access procedure for small data transmission once there is any data available for transmission in the UE's PDCP, RLC and/or MAC layer. Alternatively, the UE may trigger a BSR procedure once there is any data available for transmission in the UE's PDCP, RLC and/or MAC layer, and then initiate a random access procedure for small data transmission without triggering an SR procedure.

Figure 10:
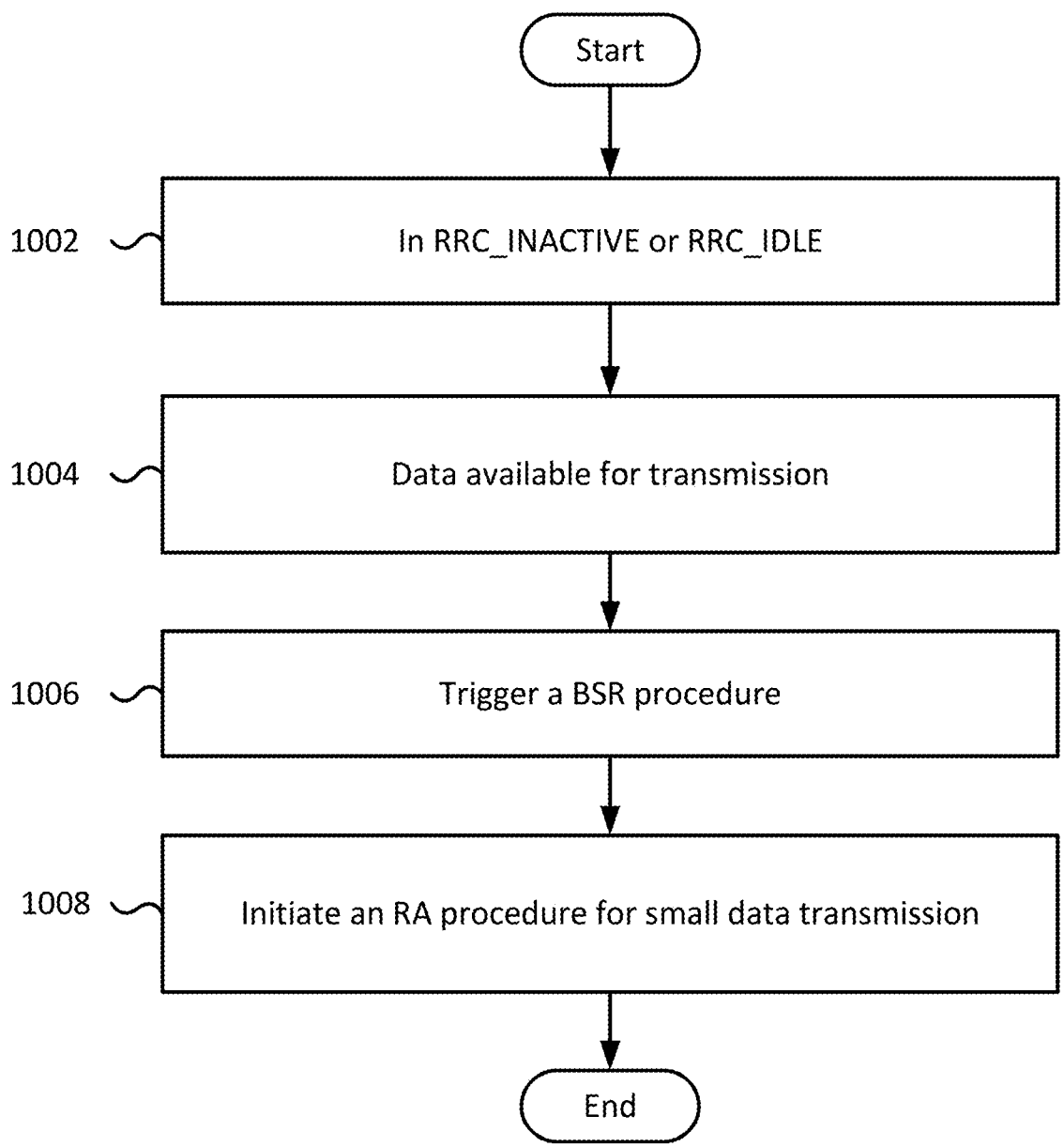
FIG. 10 illustrates a procedure for initiating an RA procedure for small data transmission according to an example implementation of the present disclosure.

FIG. 10 illustrates a procedure 1000 for initiating an RA procedure for small data transmission according to an example implementation of the present disclosure. In action 1002, the UE is in RRC_INACTIVE or RRC_IDLE. In action 1004, the UE determines that there is data available for transmission (in the UE's PDCP, RLC and/or MAC layer). In action 1006, the UE triggers a BSR procedure. In action 1008, the UE initiates an RA procedure for small data transmission.

Figure 11:
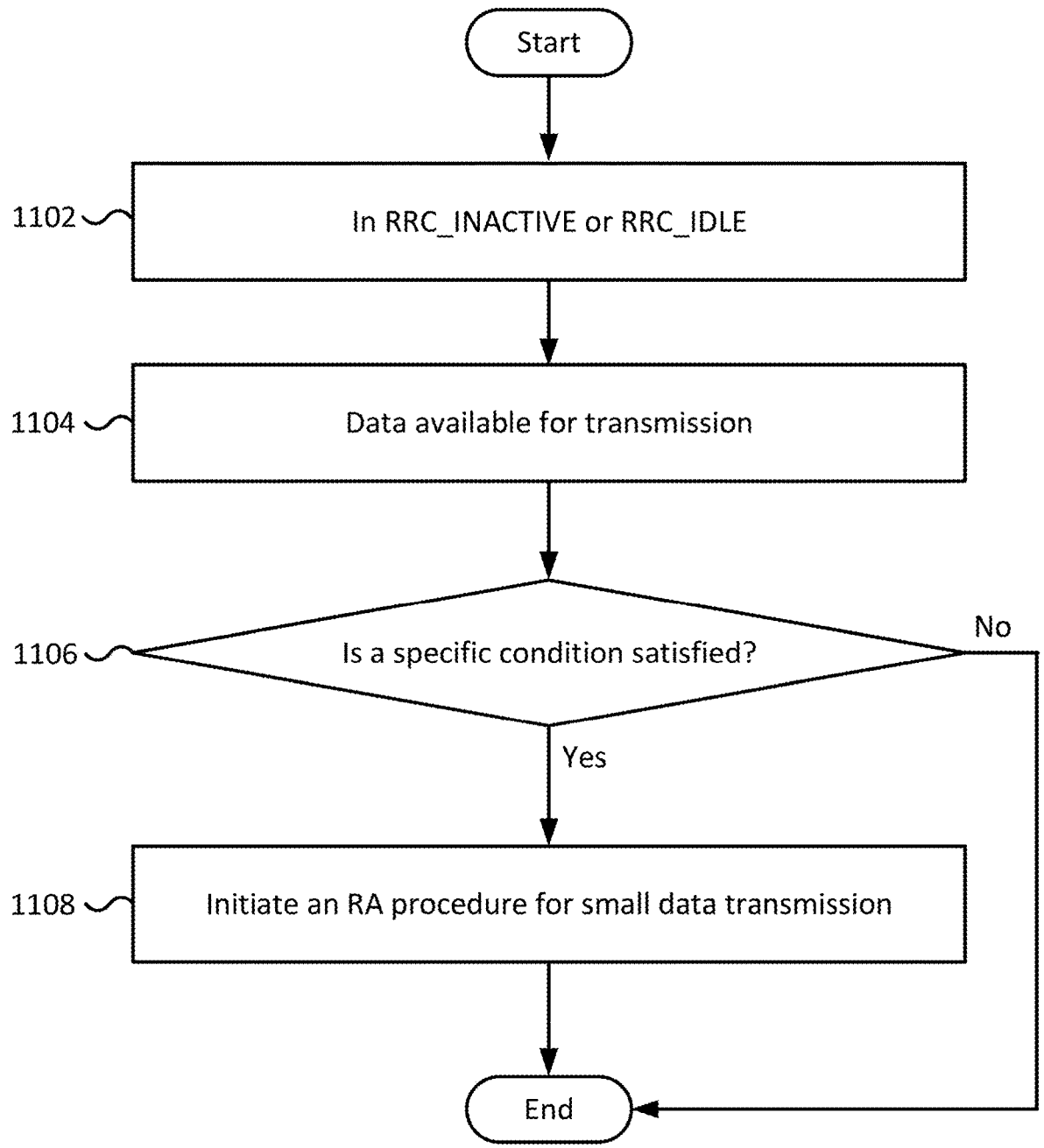
FIG. 11 illustrates a procedure for initiating an RA procedure for small data transmission according to another example implementation of the present disclosure.

FIG. 11 illustrates a procedure 1100 for initiating an RA procedure for small data transmission according to another example implementation of the present disclosure. The UE may be configured with the SD_Config and the UE may enter RRC_INACTIVE or RRC_IDLE in action 1102. In action 1104, the UE determines that there is data available for transmission (in the UE's PDCP, RLC and/or MAC layer). In this example, small data transmission via the RA procedure may not always be triggered by the MAC entity of the UE when there is data available for transmission. More specifically, the UE may determine whether a specific condition is satisfied in action 1106. If one or more specific condition is satisfied in action 1106, the UE may initiate an RA procedure for small data transmission in action 1108; otherwise, the procedure 1100 ends. In one implementation, the RA procedure for small data transmission in action 1108 may be triggered only when one or more specific condition is satisfied in action 1106. Implementations regarding the procedure 1100 are disclosed below.

Regarding the specific condition in action 1106, the UE may check whether a specific timer is running or not. For example, a small data transmission prohibit timer, SDP Timer, may be introduced for controlling how frequently the UE can transmit small data via RA. Once the MAC entity of the UE has data available for transmission, the UE may check whether the small data transmission prohibit timer is running or not. If the small data transmission prohibit timer is running, the UE may not initiate an RA procedure for small data transmission. On the other hand, if the small data transmission prohibit timer is not running, the UE may initiate the RA procedure for small data transmission. Several implementations corresponding to the small data transmission prohibit timer are disclosed below.

The small data transmission prohibit timer is configured by the gNB via the SD_Config.

The initial value of the SDP Timer is configured by the gNB via the SD_Config.

The unit of the initial value of the SDP Timer may be configured as one of the following units: millisecond, a fraction of millisecond, symbol (of the BWP on which the corresponding RA preamble or small data is transmitted), slot (of the BWP on which the corresponding RA preamble or small data is transmitted), subframe, the period of RACH resources configured for the RA procedure for small data transmission, and the period of a configured long/short DRX cycle.

The SDP Timer may be configured per BWP/serving cell/serving cell group by the gNB. In one implementation, if the SDP Timer is configured per BWP by the gNB and a first SDP Timer of a first BWP is running and the UE determines to initiate another RA (for small data transmission) on a second BWP, the UE may stop the RA procedure on the first BWP and also stop the SDP Timer associated with the first BWP.

The SDP Timer may be maintained per BWP/serving cell/serving cell group by the UE. The RA procedure for small data transmission on each BWP, each serving cell, each serving cell group may be controlled by a BWP-specific SDP Timer, a serving cell-specific SDP Timer, a serving cell group-specific SDP Timer, respectively.

The small data transmission prohibit timer (SDP Timer) may be started at one or more timing listed below:

At the end of small data transmission on a PUSCH;

At the end of small data transmission on a PUSCH (corresponding to a first preamble transmission within one random access procedure);

At the end of the first/last repetition of the small data transmission on a PUSCH (corresponding to a first preamble transmission within one random access procedure);

At the first symbol after (the end of the first/last repetition of) the small data transmission on a PUSCH (corresponding to a first preamble transmission within one random access procedure);

At the first slot after (the end of the first/last repetition of) the small data transmission on a PUSCH (corresponding to a first preamble transmission within one random access procedure);

At the first subframe after (the end of the first/last repetition of) the small data transmission on a PUSCH (corresponding to a first preamble transmission within one random access procedure);

At the end of preamble transmission on a PRACH (corresponding to a first preamble transmission within one random access procedure);

At the end of preamble transmission on a PRACH (corresponding to a first preamble transmission within one random access procedure);

At the end of the first/last repetition of the preamble transmission on a PRACH (corresponding to a first preamble transmission within one random access procedure);

At the first symbol after (the end of the first/last repetition of) the preamble transmission on a PRACH (corresponding to a first preamble transmission within one random access procedure);

At the first slot after (the end of the first/last repetition of) the preamble transmission on a PRACH (corresponding to a first preamble transmission within one random access procedure);

At the first subframe after (the end of the first/last repetition of) the preamble transmission on a PRACH (corresponding to a first preamble transmission within one random access procedure);

At the end of the MSGB reception corresponding to the MSGA transmission;

At the end of the MSGB reception (corresponding to a first MSGA transmission within one random access procedure);

At the end of the first/last repetition of the MSGB reception (corresponding to an MSGA transmission within one random access procedure);

At the first symbol after (the end of the first/last repetition of) the MSGB reception (corresponding to a first MSGA transmission within one random access procedure);

At the first slot after (the end of the first/last repetition of) the MSGB reception (corresponding to a first MSGA transmission within one random access procedure);

At the first subframe after (the end of the first/last repetition of) the MSGB reception (corresponding to a first MSGA transmission within one random access procedure);

After a HARQ acknowledgment reception in response to the small data transmission on a PUSCH;

At the end of a HARQ acknowledgment reception in response to the small data transmission on a PUSCH;

At the end of HARQ acknowledgment reception in response to the small data transmission on a PUSCH (corresponding to a first MSGA (carrying small data) transmission within one random access procedure);

At the end of the first/last repetition of the HARQ acknowledgment reception in response to the small data transmission on a PUSCH (corresponding to a first MSGA (carrying small data) within one random access procedure);

At the first symbol after (the end of the first/last repetition of) the HARQ acknowledgment reception in response to the small data transmission on a PUSCH (corresponding to an MSGA (carrying small data) transmission within one random access procedure);

At the first slot after (the end of the first/last repetition of) the HARQ acknowledgment reception in response to the small data transmission on a PUSCH (corresponding to an MSGA (carrying small data) transmission within one random access procedure);

At the first subframe after (the end of the first/last repetition of) the HARQ acknowledgment reception in response to the small data transmission on a PUSCH (corresponding to an MSGA (carrying small data) transmission within one random access procedure);

In one implementation, the UE may use multiple small data transmission prohibit timers, where respective timers may be applied for different RA types, different service requirements, or different RRC states.

In one implementation, action 1108 illustrated in FIG. 11 may be replaced by/implemented as the UE's transmission of a preamble/MSGA/small data.

Issue #5 Subsequent Transmission after the RA Procedure

Figure 12:
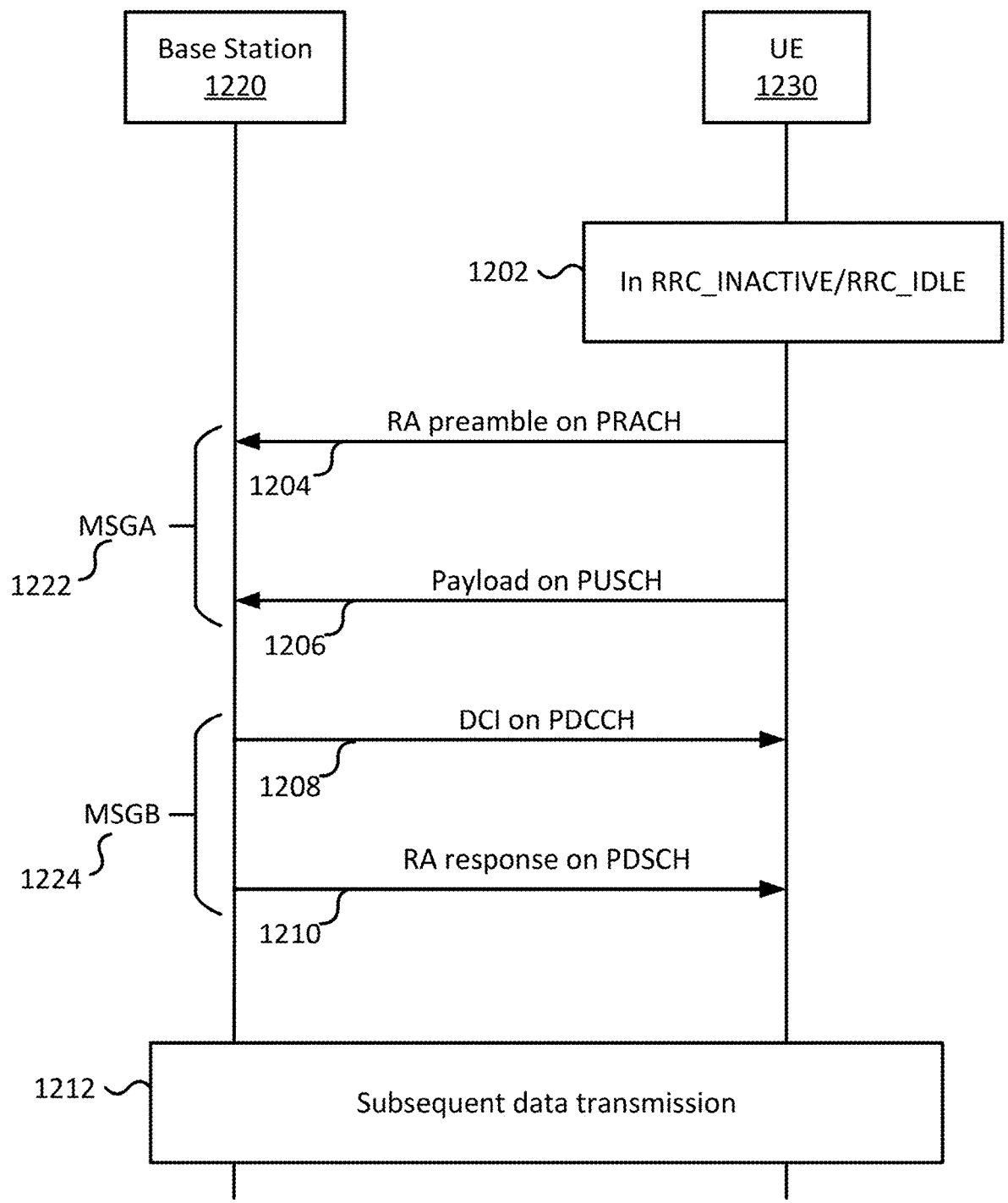
FIG. 12 illustrates a procedure for small data transmission via RA according to an example implementation of the present disclosure.

Referring to FIG. 8, the UE may perform small data transmission via RA in action 812 after the allowance check in action 808. However, it is not clear how the UE performs the small data transmission via RA. FIG. 12 illustrates a procedure 1200 for small data transmission via RA according to an example implementation of the present disclosure. In action 1202, the UE 1230 is in RRC_INACTIVE or RRC_IDLE. In action 1204, the UE 1230 may transmit an RA preamble on a PRACH to the base station 1220 (e.g., gNB). In action 1206, the UE 1230 may transmit a payload (e.g., a MAC PDU carrying small data) on a PUSCH. Transmission of the RA preamble in action 1204 and the payload in action 1206 may be referred to as an MSGA transmission 1222. In response to the MSGA transmission 1222, in action 1208, the UE 1230 may receive DCI on PDCCH that indicates an RA response (RAR) reception on a PDSCH. In action 1210, the UE 1230 may receive the RA response on the PDSCH. Reception of the DCI in action 1208 and the RA response in action 1210 may be referred to as an MSGB reception 1224.

The base station 1220 may transmit one or more of the following indicators/information to the UE 1230 via the MSGB listed below after receiving the MSGA from the UE 1230. The indicators/information may be carried in a DL RRC message (e.g., RRCSetup or RRCRelease) on the PDSCH in action 1210. The DL RRC message may be referred to as a DL response message. The DL RRC message may indicate at least one of the following information:

A DL HARQ feedback in response to the MAC PDU carried by the payload of MSGB.

An indicator indicating whether the UE 1230 is allowed to perform subsequent data transmission in action 1212.

An indicator indicating whether the UE 1230 is allowed to perform subsequent data transmission in action 1212 on a PUSCH scheduled by a dynamic grant, where the dynamic grant is scheduled by the RAR (which may be MSGB in the 2-step RA or MSG2 in the 4-step RA) or another preconfigured CORESET/PDCCH (which may be different from the CORESET for monitoring the MSGB).

An indicator indicating whether the UE 1230 is allowed to perform subsequent data transmission in action 1212 on a PUSCH scheduled by a configured grant. The indicator may be a UL resource indication indicating the PUSCH scheduled by the configured grant. The configured grant may be a preconfigured type 1 CG or type 2 CG and indicated by the MSGB or another preconfigured CORESET/PDCCH.

An indicator indicating whether the UE 1230 is allowed to perform subsequent data transmission in action 1212 on a PUSCH scheduled by a configured grant for a period of time. The period of time may be defined as: a number of periods of PUSCH resource of the CG; an actual time period (e.g., millisecond/second); and/or a number of frame/subframe/slot/symbol.

An explicit indicator indicating whether the UE 1230 transitions/enters RRC_CONNECTED for subsequent data transmission in action 1212. The indicator may be included in an RRC message (e.g., RRCSetup message) scheduled by the DCI of the MSGB in action 1208. Specifically, the base station 1220 may provide corresponding RRC setup configuration to the UE 1230 in response to the small data transmission via the MSGA. In one implementation, the UE 1230 does not transition to the RRC_CONNECTED state while performing the subsequent data transmission in action 1212.

In one implementation, the UE may perform an RA procedure for entering RRC_CONNECTED after the RA procedure for small data transmission fails. Specifically, the UE is not allowed to initiate any RA procedure for small data transmission after the RA procedure for small data transmission fails even if there is new data available for transmission within the UE.

In one implementation, the indicator disclosed previously may be contained in one or more following fields/messages, but not limited thereto:

A DCI field (of the MSGB);
A DCI (of the MSGB) with CRC bits scrambled by a (preconfigured/predefined) RNTI;
A DL MAC PDU (of the MSGB);
A MAC subPDU (of the MSGB);
A (sub)header of a MAC subPDU (of the MSGB);
A DL MAC CE (of the MSGB);
A MSGB;
A DCI that schedule a PDSCH reception corresponding to the MSGB;
A MAC PDU of the MSGB;
A subPDU within the MAC PDU of the MSGB;
A fallback RAR within the MSGB;
A success RAR within the MSGB;
A (sub)header of a fallback RAR within the MSGB;
A (sub)header of a success RAR within the MSGB; and/or
A (sub)header of a subPDU of a MAC PDU of the MSGB.

Issue #6 Configuring AS Layer of UE

Figure 13:
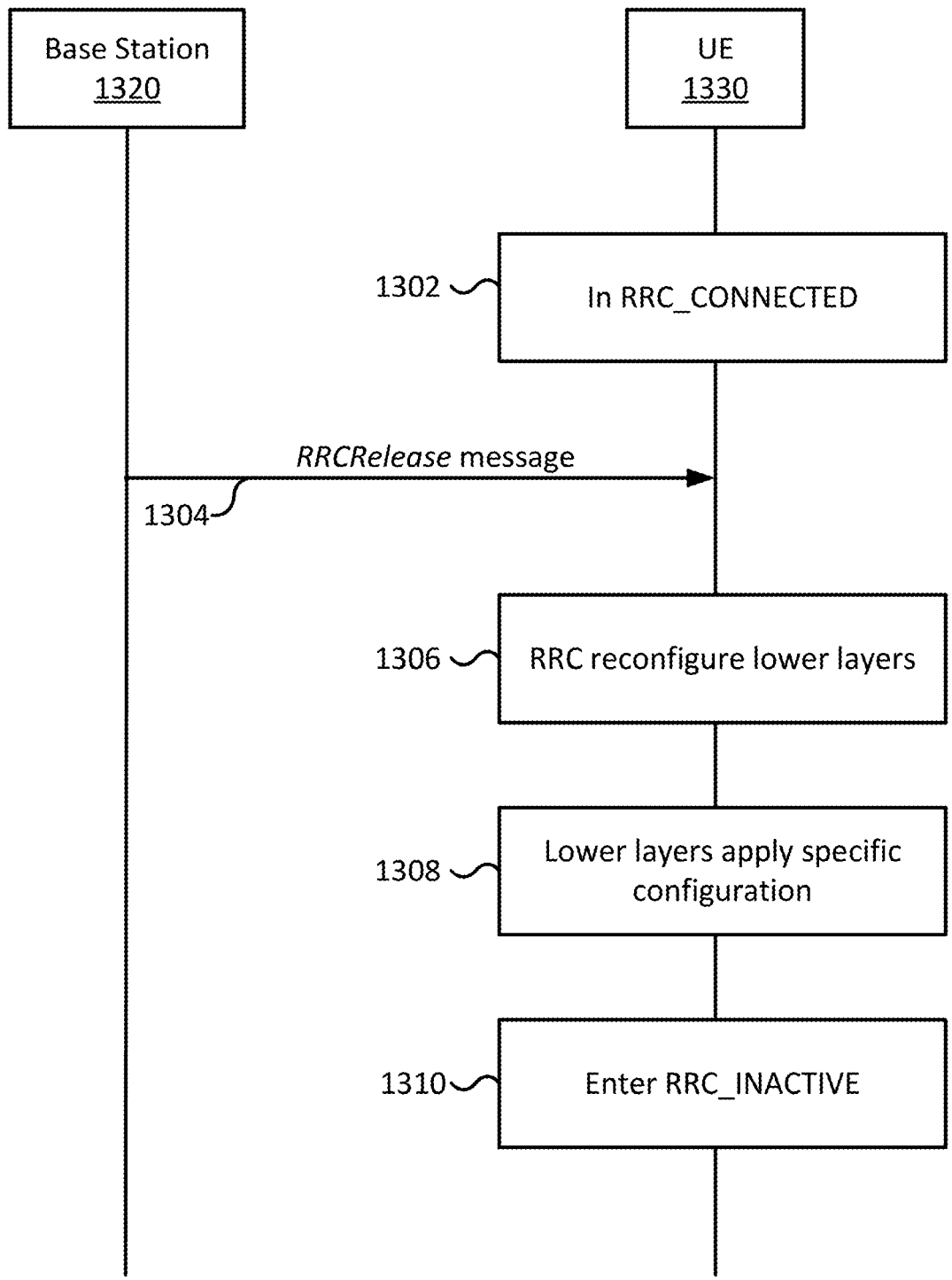
FIG. 13 illustrates an RRC connection release procedure specific to small data according to an example implementation of the present disclosure.

Referring to FIG. 6, the gNB may provide some specific configuration (e.g., SD_Config) to the UE via the RRCRelease message in action 604. Different from the current RRC connection release procedure as defined in NR, the UE may perform some different reactions in response to the received SD_Config. FIG. 13 illustrates an RRC connection release procedure 1300 specific to small data according to an example implementation of the present disclosure. In action 1302, the UE 1330 is in RRC_CONNECTED. In action 1304, the UE 1330 receives an RRCRelease message from the base station 1320. The RRCRelease message may contain an RRC configuration, also referred to as a small data transmission configuration (i.e., SD_Config), which provides the configuration to the UE 1330 for supporting small data transmission via the RA procedure in RRC_INACTIVE.

After the RRC layer of the UE 1330 successfully receives the RRCRelease message, in action 1306, the RRC layer may reconfigure lower layers. Specifically, within the UE 1330, the RRC layer may provide some corresponding configuration to the lower layers (e.g., MAC, RLC, PDCP and/or SDAP layer), and the RRC layer may also instruct the lower layers to perform some specific reconfiguration according to the SD_Config. 1n action 1308, the lower layers may apply the specific configuration (according to the SD_Config). Afterward, the UE may enter RRC_INACTIVE in action 1310.

Implementations of the detailed UE behavior corresponding to the small data specific RRC connection release procedure illustrated in FIG. 13 are disclosed below.

Regarding the RRCRelease message received in action 1304, the UE 1330 may receive the SD_Config along with the RRCRelease message. The SD_Config may contain one or more indicators/configuration listed below.

An indicator that indicates one or multiple radio bearers to be applied for the small data transmission via the RA procedure. For example, the indicator may be:
    A parameter indicating an ID of a corresponding radio bearer;
    A bitmap. Each bit of the bitmap is associated with one configured radio bearer while in RRC_CONNECTED. A bit set to '1' may indicate that the corresponding radio bearer is applied for the small data transmission via RA, while a bit set to '0' may indicate that the corresponding radio bearer is not applied for the small data transmission via RA. For example, the $i^{th}$ bit of the bitmap may be associated with a radio bearer that has the $i^{th}$ largest/smallest ID among all configured radio bearers or all configured data radio bearers.

An indicator that indicates one or more HARQ process(es) to be applied by the MAC and/or PHY of the UE for the small data transmission via RA.

A small data-specific logical channel configuration that configures one or more parameters to be applied by the MAC entity for the UE for the logical channel associated with the indicated radio bearer. The parameter may be one or more parameters listed in Table 3.

TABLE 3 fields in a LogicalChannelConfig IE allowedSCS-List
If present, UL MAC SDUs from this logical channel can only be mapped to the indicated numerology. Otherwise, UL MAC SDUs from this logical channel can be mapped to any configured numerology. Only the values 15/30/60 kHz (for FR1) and 60/120 kHz (for FR2) are applicable. Corresponds to 'allowedSCS-List' as specified in TS 38.321.
allowedServingCells
If present, UL MAC SDUs from this logical channel can onlt be mapped to the serving cells indicated in this list. Otherwise, UL MAC SDUs from this logical channel can be mapped to any configured serving cell of this cell group. Corresponds to 'allowedServingCells' in TS 38.321.
bucketSizeDuration
Value in ms. ms5 corresponds to 5 ms, value ms10 corresponds to 10 ms, and so on.
logicalChannelGroup
ID of the logical channel group, as specified in TS 38.321, which the logical channel belongs to.
logicalChannelSR-Mask
Controls SR triggering when a configured uplink grant of type1 or type2 is configured. true indicates that SR masking is configured for this logical channel as specified in TS 38.321.

TABLE 3-continued fields in a LogicalChannelConfig IE logicalChannelSR-DelayTimerApplied
Indicates whether to apply the delay timer for SR transmission for this logical channel. Set to false if logicalChannelSR-DelayTimer is not included in BSR-Config.
maxPUSCH-Duration
If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. Corresponds to "maxPUSCH-Duration" in TS 38.321.
priority
Logical channel priority, as specified in TS 38.321.
prioritisedBitRate
Value in kiloBytes/s. Value kBps0 corresponds to 0 kiloBytes/s, value kBps8 corresponds to 8 kiloBytes/s, value kBps16 corresponds to 16 kiloBytes/s, and so on. For SRBs, the value can only be set to infinity.
schedulingRequestId
If present, it indicates the scheduling request configuration applicable for this logical channel, as specified in TS 38.321.

In one implementation, a logical channel may be configured with a first logical channel configuration (e.g., LogicalChannelConfig IE) for the RRC_CONNECTED state and a second logical channel configuration for the RRC_INACTIVE state. Specifically, the MAC entity may release (part of) the first logical channel configuration and apply the second logical channel configuration while performing the small data transmission via the RA procedure.

In one implementation, a first logical channel is associated with a first radio bearer that is indicated by the gNB to be applied by the UE for the small data transmission via RA. Before receiving the RRCRelease message with the SD_Config, the MAC entity of the UE may apply a first configuration of LCP related parameters (e.g., priority, prioritisedBitRate and/or bucketSizeDuration) and/or the LCP restriction related parameters (e.g., allowedSCS-List, allowedServingCell and/or maxPUSCH-Duration) when the UE is in RRC_CONNECTED. But the UE may apply a second configuration of LCP related parameters and/or the LCP restriction related parameters for the small data transmission via RA when the UE in RRC_INACTIVE. The second configuration may be received in the SD_Config, but not limited thereto.

Table 4 illustrates an example specific MAC cell group configuration including one or more parameters (as defined in the 3GPP TS 38.331) and a corresponding value for each parameter.

TABLE 4 a specific MAC cell group configuration

| Parameter | Value (example) |
|---|---|
| MAC Cell Group configuration | |
| bsr-Config | |
| >periodicBSR-Timer | sf10 |
| >retxBSR-Timer | sf80 |
| phr-Config | |
| >phr-Periodic Timer | sf10 |
| >phr-ProhibitTimer | sf10 |
| >phr-Tx-PowerFactorChange | dB1 |

For example, a MAC entity of the UE may be allowed/indicated/configured by the gNB for the small data transmission via RA. Before receiving the RRCRelease message with the SD_Config, the MAC entity of the UE may apply a first MAC cell group configuration for BSR related parameters (e.g., periodicBSR-Timer and/or retxBSR-Timer) and/or the PHR related parameters (i.e., phr-PeriodicTimer, phr-ProhibitTimer and/or phr-Tx-PowerFactorChange) when the UE is in RRC_CONNECTED. But the UE may apply a second MAC cell group configuration for BSR related parameters and/or the PHR related parameters for the small data transmission via RA when the UE is in RRC_INACTIVE. The second MAC cell group configuration may be received in the SD_Config, but not limited thereto.

It should be noted that the values listed in Table 4 for each parameter are just exemplary rather than limiting. The gNB may configure the UE with multiple sets of these parameters and corresponding values. The UE may apply one of the multiple sets for the small data transmission via RA while in RRC_INACTIVE.

In one implementation, configurations of one or more parameters corresponding to the BSR, PHR, LCP and/or LCP restriction related parameters configured for the RRC_CONNECTED state may be retained by the UE upon entering the RRC_INACTIVE state. In one implementation, the gNB may indicate to the UE which parameters configured for the RRC_CONNECTED state are to be retained when entering the RRC_INACTIVE state.

In one implementation, the configuration and/or the indicator disclosed previously may also be preconfigured by the gNB, via an RRCReconfiguration message, before the gNB initiates the RRC release procedure.

In one implementation, the configuration and/or the indicator disclosed previously may also be preconfigured by the gNB, via a suspendConfig IE (as introduced and defined in the 3GPP TS 38.331) contained in the RRCRelease message, before the gNB initiates the RRC release procedure.

Regarding action 1306 in which the RRC layer reconfigures lower layers, the RRC layer of the UE may reconfigure lower layers upon the RRC connection release procedure initiated by the gNB. However, if the RRCRelease message contains a configuration specific to small data transmission via RA (e.g., SD_Config), the RRC layer of the UE may additionally reconfigure the lower layers according to the SD_Config received in the RRCRelease message in action 1304.

Figure 14:
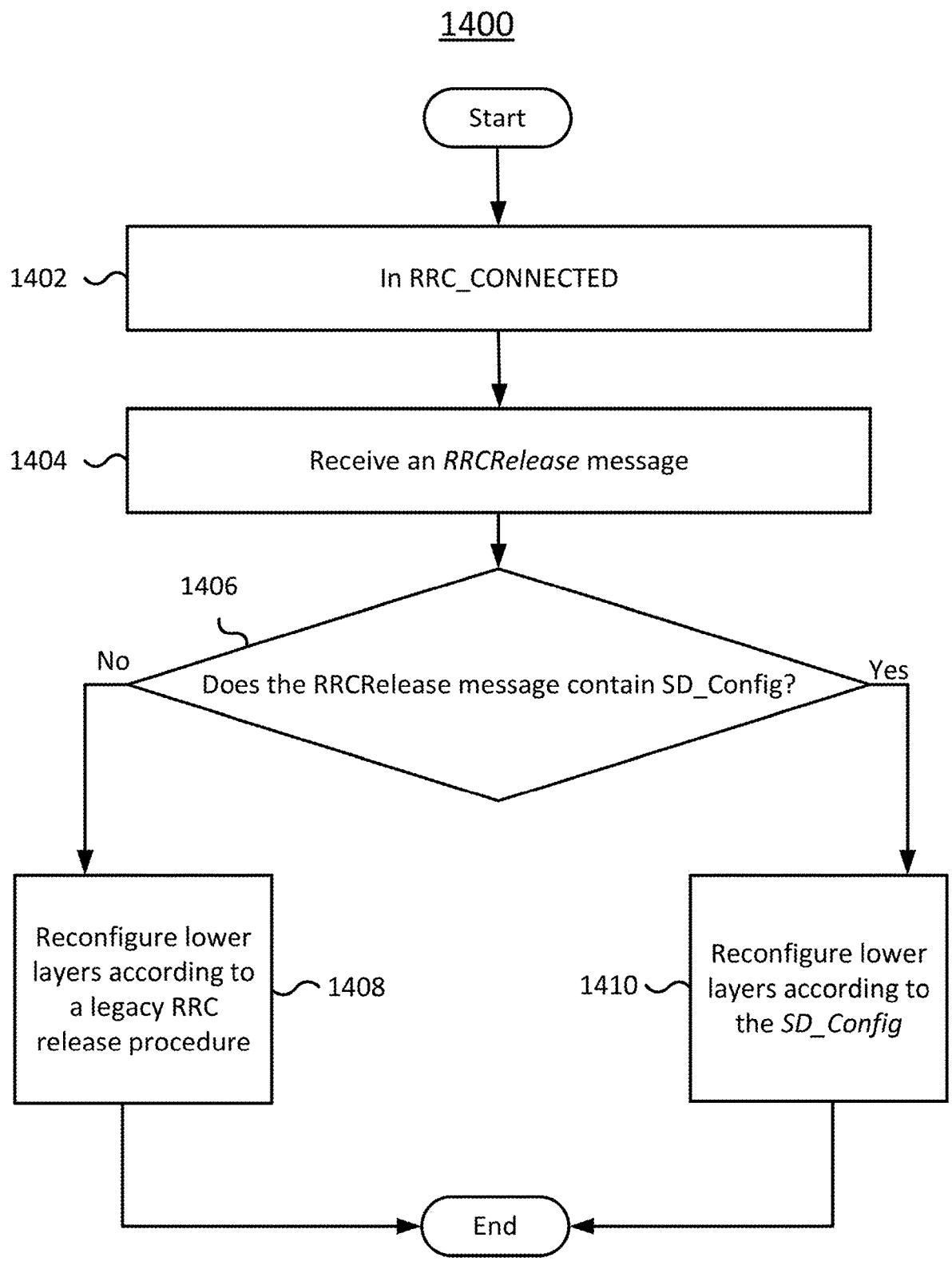
FIG. 14 illustrates an RRC connection release procedure performed by the UE according to an example implementation of the present disclosure.

FIG. 14 illustrates an RRC connection release procedure 1400 performed by the UE according to an example implementation of the present disclosure. The RRC connection release procedure 1400 may be initiated by a gNB. In action 1402, the UE is in the RRC_CONNECTED state. In action

1404, the UE receives an RRCRelease message while in RRC_CONNECTED. In action 1406, the UE may check whether the RRCRelease message contains a configuration specific to small data transmission via RA (e.g., SD_Config). If the RRCRelease message contains the SD_Config, the RRC layer of the UE may reconfigure lower layers according to the SD_Config in action 1410. Otherwise, the UE may reconfigure lower layers according to a legacy RRC release procedure in action 1408, which may be NR Release Rel.15 behavior.

Action 1410 may include one or multiple actions listed below:
Apply the received SD_Config.
Retain the MAC configuration (e.g., not to reset MAC).
Retain the default MAC cell group configuration.
Release the default MAC cell group configuration.
Apply the specific MAC cell group configuration disclosed in section of issue #6.
Re-establish RLC entities for radio bearer indicated by the gNB (via the SD_Config).
(Re)Configure RLC entities for the radio bearer indicated by the gNB (via the SD_Config).
Suspend all SRB(s) and DRB(s), except SRB0 and the radio bearer(s) indicated by the gNB for the small data transmission via the random access procedure. The small data transmission via the random access procedure in the present disclosure may be interpreted as: the UE performs UL data transmission on a PUSCH by initiating an RA procedure, performs corresponding UL data transmission within the MSGA/MSG3, or performs UL data transmission on a PUSCH after the RA procedure or after the reception of MSGB/MSG4 (which may be referred to as subsequent transmission or subsequent data transmission).
Suspend all SRB(s) and DRB(s), except SRB0 and the radio bearer(s) indicated by the gNB (via the SD_Config).
Indicate PDCP suspend to lower layers of all DRBs, except the radio bearer(s) indicated by the gNB for the small data transmission via the random access procedure.
Indicate PDCP suspend to lower layers of all DRBs except the radio bearer(s) indicated by the gNB (via the SD_Config).
Indicate to lower layers (e.g., MAC and/or PHY) the HARQ process(es) indicated by the gNB (via the SD_Config) for the small data transmission via random access procedure.
If the RRCRelease message with SD_Config is neither received in response to an RRCResumeRequest nor an RRCResumeRequest1, store in the UE Inactive AS Context the configured suspendConfig, the current $K_{gNB}$ and $K_{RRCint}$ keys, the ROHC state, the C-RNTI used in the source PCell, the cellIdentity and the physical cell identity of the source PCell, and all other parameters configured except with ReconfigurationWithSync.

Inform the upper layer that access barring is applicable for the access category indicated by the gNB (via the SD_Config).
Indicate that the reconfiguration corresponding to the SD_Config is complete to upper layers. In one implementation, the RRC layer of the UE may receive an indication from lower layers for indicating the completion of the reconfiguration corresponding to the SD_Config.

In one implementation, action 1406 illustrated in FIG. 14 may be replaced by one or more conditions listed below.

Does the RRCRelease message contain a suspendConfig IE (an IE applied by the gNB for indicating configuration for the RRC_INACTIVE state as defined in the 3GPP TS 38.331)?
Does the suspendConfig IE contain the SD_Config IE?
Does the RRCRelease message contain a suspendConfig IE and does the suspendConfig IE contain the SD_Config IE?

Action 1408 illustrated in FIG. 14 may be legacy behavior defined in the current 3GPP TS 38.331 for the UE that needs to perform RRC release in response to the RRCRelease message received from the gNB.

Table 5 illustrates an example text proposal of the 3GPP TS 38.331 for the disclosed RRC connection release procedure, such as the procedure 1400 illustrated in FIG. 14.

TABLE 5 a text proposal of the 3GPP TS 38.331

The UE shall:
1> if the RRCRelease includes suspendConfig:
  2>if the suspendConfig includes SD_Congif:
    3>apply the received SD_Config;
    3>apply the specific MAC Cell Group configuration, if any;
    3>(re)configure RLC entities for the radio bearer indicated by the SD_Config;
    3>suspend all SRB(s) and DRB(s), except SRB0 and the radio bearer(s)
      indicated by the gNB (via the SD_Config);
    3>indicate PDCP suspend to lower layers of all DRBs except the radio
      bearer(s) indicated by the gNB (via the SD_Config);
    3>indicate to lower layers (i.e., MAC and/or PHY) the HARQ process(es)
      indicated by the gNB (via the SD_Config).

Figure 15:
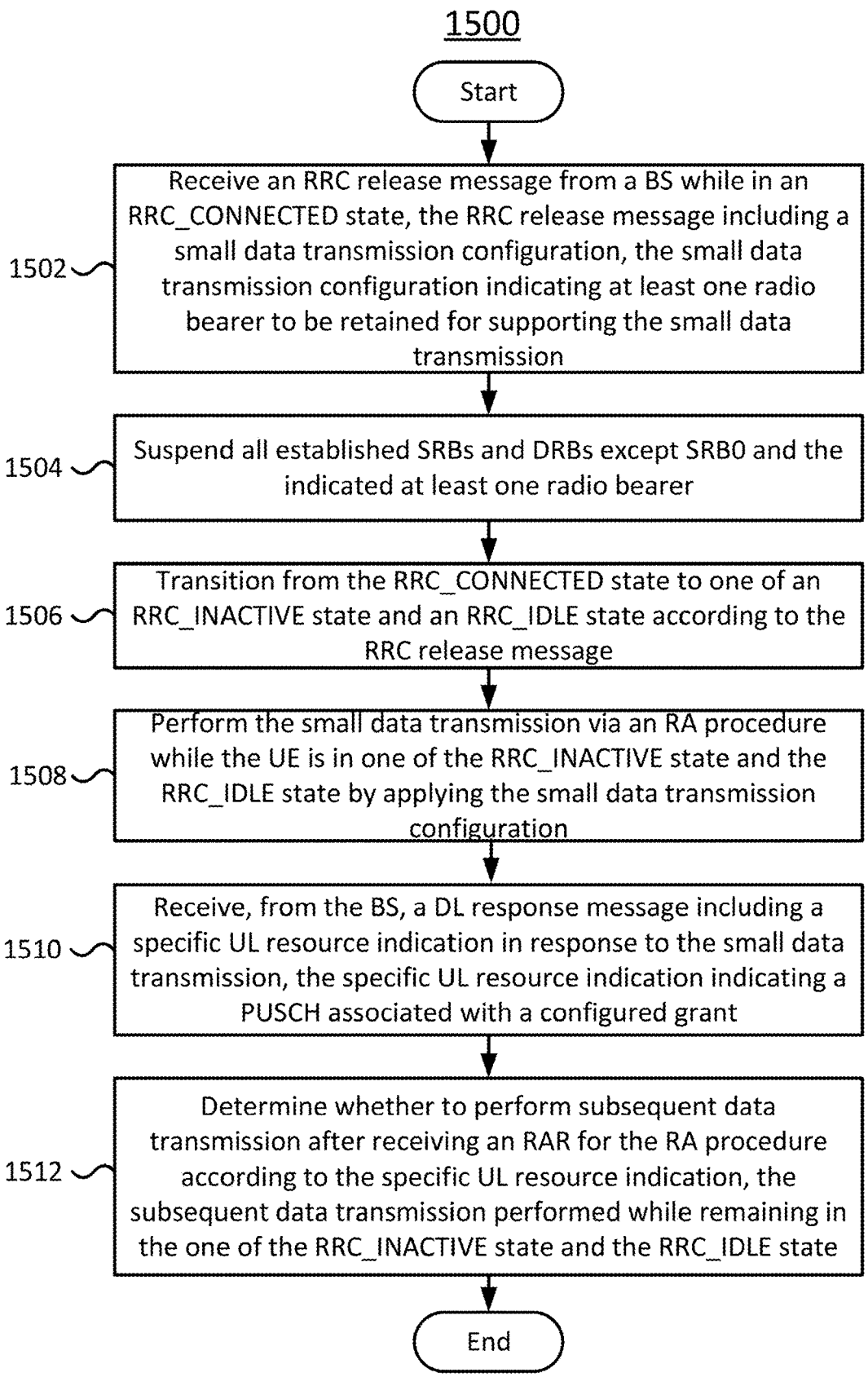
FIG. 15 illustrates a method for small data transmission performed by a UE according to an example implementation of the present disclosure.

FIG. 15 illustrates a method 1500 for small data transmission performed by a UE according to an example implementation of the present disclosure. In action 1502, the UE receives an RRC release message (e.g., RRCRelease) from a BS while in an RRC_CONNECTED state, the RRC release message including a small data transmission configuration (e.g., SD_Config), the small data transmission configuration indicating at least one radio bearer to be retained for supporting the small data transmission. For example, the small data transmission configuration may indicate at least one radio bearer to be applied while performing the small data transmission via an RA procedure. In action 1504, the UE suspends all established SRBs and DRBs except SRB0 and the indicated at least one radio bearer (e.g., indicated by SD_Config).

In action 1506, the UE transitions from the RRC_CONNECTED state to one of an RRC_INACTIVE state and an RRC_IDLE state according to the RRC release message. For example, the RRC release message may include an RRC state indicator (e.g., State_Indicator) indicating which RRC state (e.g., RRC_INACTIVE or RRC_IDLE) the UE transitions to. In action 1508, the UE performs the small data transmission via an RA procedure while the UE is in one of the RRC_INACTIVE state and the RRC_IDLE state by applying the small data transmission configuration.

In action 1510, the UE receives, from the BS, a DL response message including a specific UL resource indication in response to the small data transmission via the RA procedure. The specific UL resource indication indicates a PUSCH associated with a configured grant. For example, the specific UL resource indication indicates a PUSCH scheduled by a configured grant. In action 1512, the UE determines whether to perform subsequent data transmission after receiving an RAR for the RA procedure according to the specific UL resource indication. The subsequent data transmission may be performed while remaining/staying in the one of the RRC_INACTIVE state and the RRC_IDLE state. In one implementation, the UE does not transition to the RRC_CONNECTED state while performing the subsequent data transmission.

It should be noted that the small data transmission via the disclosed random access procedure may be interpreted as: the UE performs UL data transmission on a PUSCH by initiating an RA procedure, performs corresponding UL data transmission within the MSGA/MSG3, or performs UL data transmission on a PUSCH after the RA procedure or after the reception of MSGB/MSG4 (which may be referred to as subsequent transmission or subsequent data transmission).

It should be noted that all of the implementations/embodiments/examples/alternatives disclosed in the present disclosure may be applied to not only the UE in RRC_INACTIVE but also the UE in RRC_IDLE. All implementations in the present disclosure are not limited to application to address the problem identified in the present disclosure. For example, the disclosed implementations may be applied to solve any problem existing in a RAN of a cellular wireless communication system. All the numbers in the implementations in the present disclosure are just exemplary rather than limiting. The numbers are provided as an example to better illustrate how the method is executed.

The DL RRC message in the present disclosure may be RRCReconfiguration, RRCResume, RRCReestablishment, RRCSetup or any other DL unicast RRC message.

The expression "a specific configuration is configured per UE" or "a specific configuration is provided to a UE" in the present disclosure may mean that the specific configuration may be provided via a DL RRC message.

The expression "a specific configuration is configured per cell group" or "a specific configuration is provided to a cell group" in the present disclosure may mean that the specific configuration may be provided via a CellGroupConfig, MAC-CellGroupConfig or PhysicalCellGroupConfig IE.

The expression "a specific configuration is configured per serving cell" or "a specific configuration is provided to a serving cell" in the present disclosure may mean that the specific configuration may be provided via a ServingCellConfigCommon, ServingCellConfig, PUSCH-ServingCellConfig or PDSCH-ServingCellConfig IE.

The expression "a specific configuration is configured per UL BWP or per BWP" or "a specific configuration is provided via a UL BWP or for a BWP" in the present disclosure may mean that the specific configuration may be provided via a BWP-Uplink, BWP-UplinkDedicated, BWP-UplinkCommon, PUSCH-ConfigCommon or PUSCH-Config IE.

The expression "a specific configuration is configured per DL BWP or per BWP" or "a specific configuration is provided via a DL BWP or a BWP" in the present disclosure may mean that the specific configuration may be provided via a BWP-Downlink, BWP-DownhnkDedicated, BWP-DownlinkCommon, PDSCH-ConfigCommon or PDSCH-Config IE.

The term "beam" in the present disclosure is equivalent to a spatial (domain) filtering. In one example, the spatial filtering is applied in analog domain by adjusting phase and/or amplitude of the signal before transmitted by a corresponding antenna element. In another example, the spatial filtering is applied in digital domain by Multi-input Multi-output (MIMO) technique in wireless communication system. For example, a UE made a PUSCH transmission by using a specific beam means the UE made the PUSCH transmission by using the specific spatial/digital domain filter. The "beam" may also be represented as an antenna, an antenna port, an antenna element, a group of antennas, a group of antenna ports, or a group of antenna elements, but not limited thereto. The beam may also be formed by a certain reference signal resource. In brief, the beam may be equivalent to a spatial domain filter which radiated the EM wave through.

The term "transmitted" used in the previously disclosed implementations may mean that transmission of a corresponding MAC CE/MAC PDU/layer 1 signaling/higher layer signaling is started, is completely transmitted, or is already delivered to a corresponding HARQ process/buffer for transmission. The term "transmitted" used in the previously disclosed implementations may also mean that the HARQ ACK feedback (response from gNB) of the MAC PDU carrying the MAC CE/MAC PDU/layer 1 signaling/higher layer signaling is received. The term "transmitted" used in the previously disclosed implementations may also mean that a corresponding MAC CE/MAC PDU is built.

The "HARQ ACK feedback" may be implemented as a DCI format 0_0, DCI format 0_1 or some other DCI formats received by the UE from the gNB on PDCCH. The received DCI includes an NDI set to a specific value (e.g., set to 1) and the DCI also indicates a HARQ process ID that is the same as a HARQ process ID applied by/indicated to be used for the HARQ process of the MAC PDU transmission.

The PDCCH in the present disclosure is transmitted by the gNB to the UE. The PDCCH is received by the UE from the gNB. The PDSCH in the present disclosure is transmitted by the gNB to the UE. The PDSCH is received by the UE from the gNB. The PUSCH in the present disclosure is transmitted by the UE to the gNB. The PUSCH is received by the gNB from the UE.

A PDCCH/PDSCH/PUSCH transmission may span multiple symbols in the time domain. A time duration of a PDSCH/PDSCH/PUSCH (transmission) may represent a time interval that starts from the beginning of the first symbol of the PDSCH/PDSCH/PUSCH (transmission) and ends at the end of the last symbol of the PDSCH/PDSCH/PUSCH (transmission).

The term "A and/or B" in the present disclosure means "A", "B" or "A and B". The term "A and/or B and/or C" within the present disclosure means "A", "B", "C", "A and B", "A and C", "B and C" or "A and B and C".

The term "A/B" in the present disclosure means "A" or "B".

The term "acknowledgment" in the present disclosure may have the same meaning as "HARQ-ACK" or "HARQ-ACK feedback" in the present disclosure.

The term "repetition of a TB" in the present disclosure may have the same meaning as "repetition of a PUSCH", and the term "a TB repetition" in the present disclosure may have the same meaning as "a PUSCH repetition".

The expression "the UE may not need to perform the corresponding HARQ feedback" in the present disclosure may mean that "the HARQ entity/HARQ process may not need to perform the corresponding HARQ feedback".

In the present disclosure, the term "by specific Physical layer signaling" may include at least one of, but not limited to, by a specific format of DCI; by a specific field of DCI; by a specific field of DCI, and the field is set to a specific value or by DCI with CRC bits scrambled with a specific RNTI.

In the present disclosure, "a MAC timer" may be configured by RRC that is indicated by the gNB. The UE may be configured with an initial value of the timer. The unit of the initial value may be frame/sub-frame/millisecond/sub-millisecond/slot/symbol. The timer may be started and/or restarted by the UE (e.g., the MAC entity of the UE). The timer may be started and/or restarted by the UE (e.g., the MAC entity of the UE) when a specific condition is satisfied.

Figure 16:
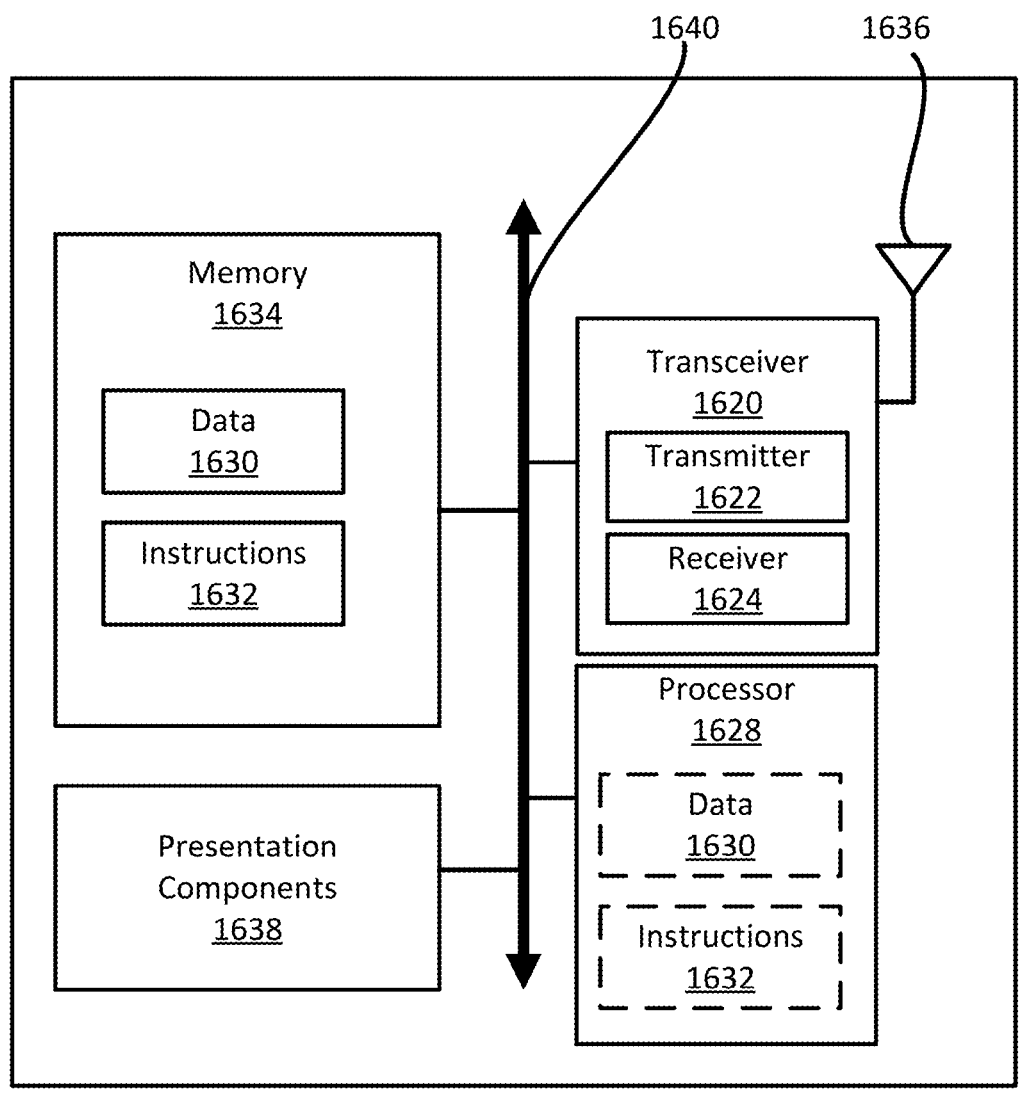
FIG. 16 is a block diagram illustrating a node for wireless communication according to an example implementation of the present disclosure.

FIG. 16 is a block diagram illustrating a node 1600 for wireless communication according to an example implementation of the present disclosure. As illustrated in FIG. 16, the node 1600 may include a transceiver 1620, a processor 1628, a memory 1634, one or more presentation components 1638, and at least one antenna 1636. The node 1600 may also include a radio frequency (RF) spectrum band module, a BS communications module, a network communications module, and a system communications management module, Input/Output (I/O) ports, I/O components, and a power supply (not illustrated in FIG. 16).

Each of the components may directly or indirectly communicate with each other over one or more buses 1640. The node 1600 may be a UE or a BS that performs various functions disclosed with reference to FIGS. 1A through 15.

The transceiver 1620 has a transmitter 1622 (e.g., transmitting/transmission circuitry) and a receiver 1624 (e.g., receiving/reception circuitry) and may be configured to transmit and/or receive time and/or frequency resource partitioning information. The transceiver 1620 may be configured to transmit in different types of subframes and slots including but not limited to usable, non-usable and flexibly usable subframes and slot formats. The transceiver 1620 may be configured to receive data and control channels.

The node 1600 may include a variety of computer-readable media. Computer-readable media may be any available media that may be accessed by the node 1600 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 1634 may include computer-storage media in the form of volatile and/or non-volatile memory. The memory 1634 may be removable, non-removable, or a combination thereof. Example memory may include solid-state memory, hard drives, optical-disc drives, etc. As illustrated in FIG. 16, the memory 1634 may store computer-readable, computer-executable instructions 1632 (e.g., software codes) that are configured to cause the processor 1628 to perform various functions disclosed herein, for example, with reference to FIGS. 1A through 15. Alternatively, the instructions 1632 may not be directly executable by the processor 1628 but be configured to cause the node 1600 (e.g., when compiled and executed) to perform various functions disclosed herein.

The processor 1628 (e.g., having processing circuitry) may include an intelligent hardware device, e.g., a Central Processing Unit (CPU), a microcontroller, an ASIC, etc. The processor 1628 may include memory. The processor 1628 may process the data 1630 and the instructions 1632 received from the memory 1634, and information transmitted and received via the transceiver 1620, the base band communications module, and/or the network communications module. The processor 1628 may also process information to be sent to the transceiver 1620 for transmission via the antenna 1636 to the network communications module for transmission to a core network.

One or more presentation components 1638 may present data indications to a person or another device. Examples of presentation components 1638 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a small data transmission performed by a user equipment (UE), the method comprising:
   receiving a Radio Resource Control (RRC) release message from a base station (BS) while the UE is in an RRC_CONNECTED state, the RRC release message including a small data transmission configuration, the small data transmission configuration indicating at least one radio bearer to be retained for supporting the small data transmission;
   suspending all established signaling radio bearers (SRBs) and data radio bearers (DRBs) except SRB0 and the indicated at least one radio bearer;
   transitioning from the RRC_CONNECTED state to one of an RRC_INACTIVE state and an RRC_IDLE state according to the RRC release message;
   performing an access barring check based on an access category associated with the small data transmission and an access identity associated with the small data transmission to determine whether the small data transmission is allowed by the BS, the access identity being associated with a bit of a bitmap included in allowance control information;

performing the small data transmission via a random access (RA) procedure while the UE is in the one of the RRC_INACTIVE state and the RRC_IDLE state by applying the small data transmission configuration;

receiving, from the BS, a downlink (DL) response message including a specific uplink (UL) resource indication in response to the small data transmission initiated by the RA procedure, the specific UL resource indication indicating whether the UE is allowed to perform a subsequent data transmission on a Physical Uplink Shared Channel (PUSCH) scheduled by a configured grant, wherein the PUSCH scheduled by the configured grant comprises a periodic uplink resource preconfigured by the BS before the UE receives the DL response message; and determining whether to perform the subsequent data transmission on the PUSCH scheduled by the configured grant after receiving a random access response (RAR) during the RA procedure according to the specific UL resource indication, the subsequent data transmission to be performed while the UE remains in the one of the RRC_INACTIVE state and the RRC_IDLE state, wherein the small data transmission configuration indicates one or more logical channels that are allowed to be used in a logical channel prioritization (LCP) procedure applied by the UE while performing the small data transmission.

2. The method of claim 1, wherein:
the DL response message indicates whether the UE is allowed to perform the subsequent data transmission on a PUSCH scheduled by a dynamic grant, and
the dynamic grant is scheduled by one of the RAR and a preconfigured Control Resource Set (CORESET).

3. The method of claim 1, wherein the small data transmission configuration further indicates a UL bandwidth part (BWP) on which the small data transmission is performed.

4. The method of claim 1, wherein the small data transmission configuration further indicates a data volume threshold for the small data transmission.

5. The method of claim 1, wherein the small data transmission configuration further indicates at least one of the access category for the small data transmission and the access identity for the small data transmission.

6. A user equipment (UE) for performing a small data transmission, the UE comprising:
at least one processor; and
at least one memory coupled to the at least one processor, the at least one memory storing computer-executable instructions that, when executed by the at least one processor, cause the UE to:
receive a Radio Resource Control (RRC) release message from a base station (BS) while the UE is in an RRC_CONNECTED state, the RRC release message including a small data transmission configuration, the small data transmission configuration indicating at least one radio bearer to be retained for supporting the small data transmission;

suspend all established signaling radio bearers (SRBs) and data radio bearers (DRBs) except SRB0 and the indicated at least one radio bearer;

transition from the RRC_CONNECTED state to one of an RRC_INACTIVE state and an RRC_IDLE state according to the RRC release message;

perform an access barring check based on an access category associated with the small data transmission and an access identity associated with the small data transmission to determine whether the small data transmission is allowed by the BS, the access identity being associated with a bit of a bitmap included in allowance control information;

perform the small data transmission via a random access (RA) procedure while the UE is in the one of the RRC_INACTIVE state and the RRC_IDLE state by applying the small data transmission configuration;

receive, from the BS, a downlink (DL) response message including a specific uplink (UL) resource indication in response to the small data transmission initiated by the RA procedure, the specific UL resource indication indicating whether the UE is allowed to perform a subsequent data transmission on a Physical Uplink Shared Channel (PUSCH) scheduled by a configured grant, wherein the PUSCH scheduled by the configured grant comprises a periodic uplink resource preconfigured by the BS before the UE receives the DL response message; and determine whether to perform the subsequent data transmission on the PUSCH scheduled by the configured grant after receiving a random access response (RAR) during the RA procedure according to the specific UL resource indication, the subsequent data transmission to be performed while the UE remains in the one of the RRC_INACTIVE state and the RRC_IDLE state, wherein the small data transmission configuration indicates one or more logical channels that are allowed to be used in a logical channel prioritization (LCP) procedure applied by the UE while performing the small data transmission.

7. The UE of claim 6, wherein:
the DL response message indicates whether the UE is allowed to perform the subsequent data transmission on a PUSCH scheduled by a dynamic grant, and
the dynamic grant is scheduled by one of the RAR and a preconfigured Control Resource Set (CORESET).

8. The UE of claim 6, wherein the small data transmission configuration further indicates a UL bandwidth part (BWP) on which the small data transmission is performed.

9. The UE of claim 6, wherein the small data transmission configuration further indicates a data volume threshold for the small data transmission.

10. The UE of claim 6, wherein the small data transmission configuration further indicates at least one of the access category for the small data transmission and the access identity for the small data transmission.

* * * * *